(12) United States Patent
Ideyama

(10) Patent No.: US 6,345,118 B1
(45) Date of Patent: *Feb. 5, 2002

(54) IMAGE PROCESSING APPARATUS

(75) Inventor: Hiroyuki Ideyama, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/747,835

(22) Filed: Nov. 13, 1996

(30) Foreign Application Priority Data

Nov. 13, 1995 (JP) .............................. 7-294212

(51) Int. Cl.⁷ ................................................ G06K 9/34
(52) U.S. Cl. ...................... 382/175; 399/85; 358/537
(58) Field of Search .................. 358/444, 448, 358/452, 453, 485, 498, 518, 538, 537; 382/164, 282; 399/182, 85

(56) References Cited

U.S. PATENT DOCUMENTS

| | | | |
|---|---|---|---|
| 4,538,182 A | 8/1985 | Saito et al. ............ 382/162 |
| 4,617,596 A | * 10/1986 | Yoshida et al. ........ 358/280 |
| 4,837,635 A | 6/1989 | Santos .................. 358/401 |
| 4,908,716 A | * 3/1990 | Sakano ................. 358/453 |
| 5,079,625 A | * 1/1992 | Kitamura et al. ...... 358/538 |
| 5,111,333 A | 5/1992 | Sekine et al. ......... 358/518 |
| 5,162,918 A | * 11/1992 | Muramatsu ............ 358/452 |
| 5,220,416 A | 6/1993 | Hasebe et al. ......... 358/517 |
| 5,259,041 A | 11/1993 | Kato et al. ............ 382/164 |
| 5,363,212 A | 11/1994 | Taniuchi et al. |
| 5,406,389 A | * 4/1995 | Hasegawa et al. ..... 358/452 |
| 5,436,735 A | * 7/1995 | Tanabe et al. ......... 358/452 |
| 5,493,424 A | * 2/1996 | Tomita et al. ......... 358/453 |
| 5,515,144 A | * 5/1996 | Miyasaka et al. ...... 358/452 |
| 5,552,900 A | * 9/1996 | Someya ................. 358/452 |
| 5,557,430 A | * 9/1996 | Isemura et al. ........ 358/501 |
| 5,623,559 A | * 4/1997 | Okuchi ................. 382/293 |
| 5,937,233 A | * 8/1999 | Nakata et al. ......... 399/8 |

FOREIGN PATENT DOCUMENTS

| | | |
|---|---|---|
| EP | 0 491 994 A2 | 5/1985 |
| EP | 0 307 948 A2 | 3/1989 |
| GB | 2 160 737 A | 12/1985 |
| JP | 5-14630 | 1/1993 |
| JP | 5-211600 | * 8/1993 |

* cited by examiner

*Primary Examiner*—Samir Ahmed
(74) *Attorney, Agent, or Firm*—Burns, Doane, Swecker & Mathis, LLP

(57) ABSTRACT

An image read by an image reader is rendered into binary data and then is stored in a document reading memory. In accordance with the color information provided to the document by a color marker which is stored in the document reading memory, a document image subjected to image processing is displayed on a color LCD. The user can check the color LCD before printing by a printer, such that photocopying by mistake and the like can be prevented.

16 Claims, 18 Drawing Sheets

FIG.6(A)
FIG.6(B)
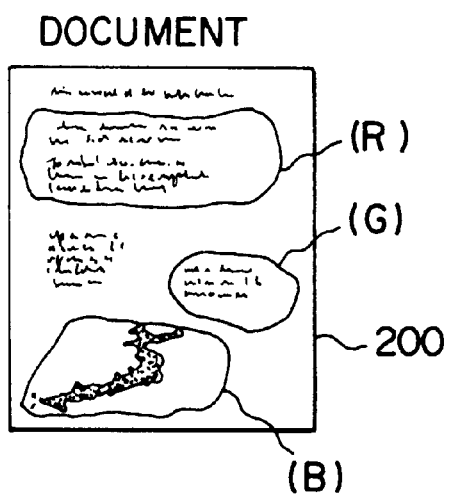
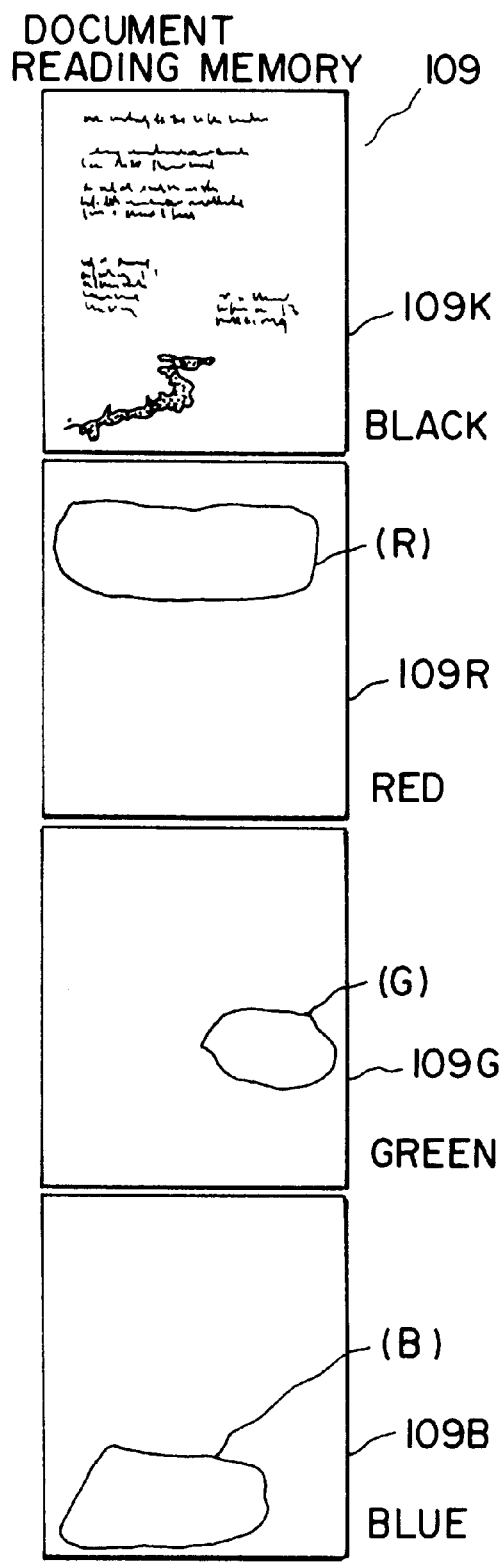

FIG. 7(A)
DISPLAYING MEMORY
FIG. 7(B)
EDITING MEMORY
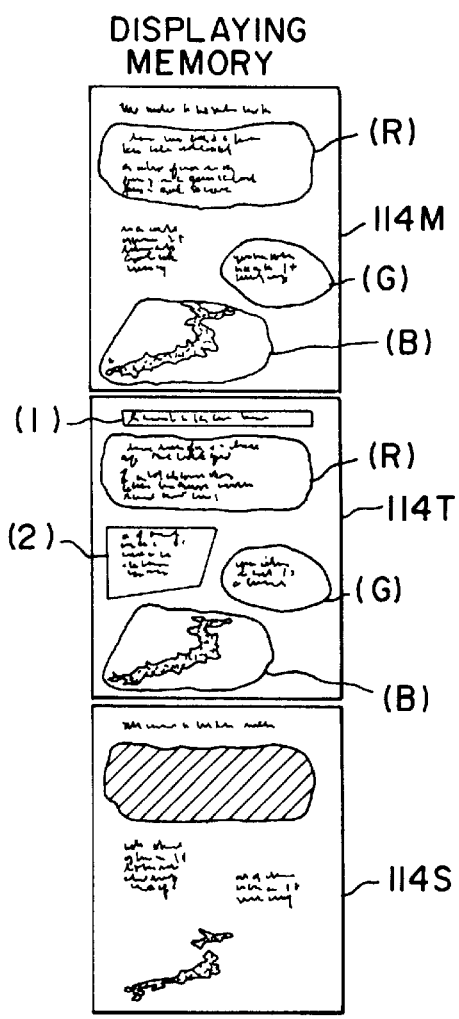
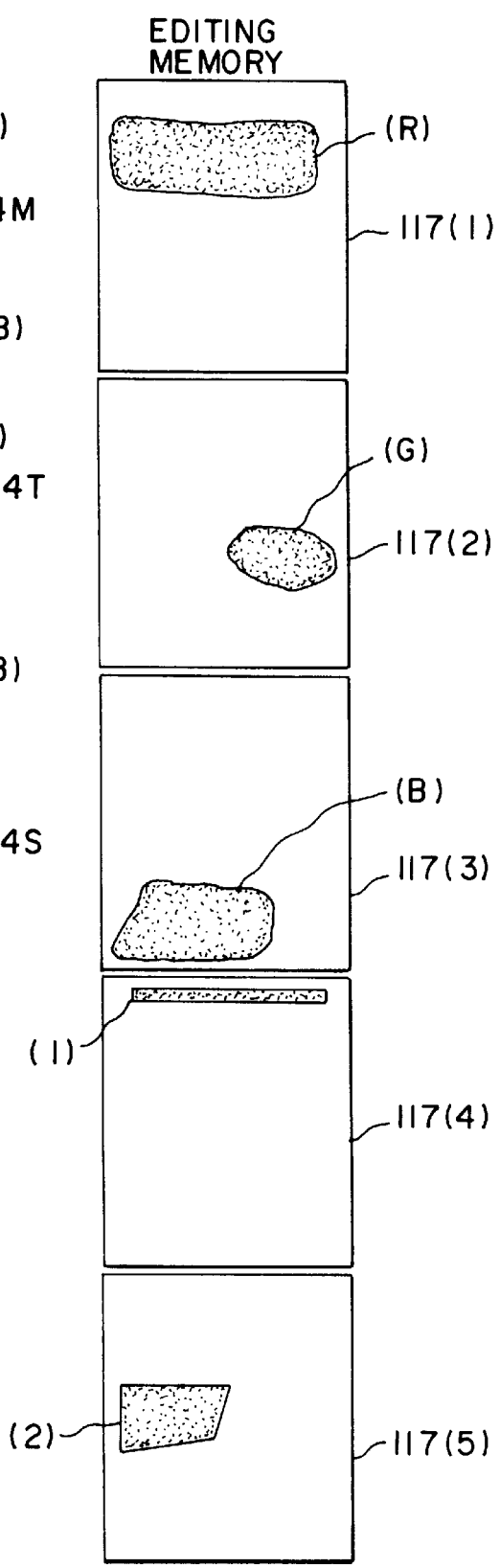

IMAGE PROCESSING APPARATUS

BACKGROUND OF THE INVENTION

1. Field of the Invention

The present invention relates to an image processing apparatus, and particularly to an image processing apparatus which reads a document having information for editing images (i.e., area specification) marked thereon by a marker to perform an image editing process to the read document image according to the read information.

2. Description of the Related Art

Image processing apparatuses are disclosed in U.S. Pat. No. 5,220,416; U.S. Pat. No. 5,259,041; U.S. Pat. No. 4,538,182 and Japanese Patent Laying-Open No. 5-14630 in which a user marks or specifies an area of a document by a color marker (the term, as used herein, refers to a coloring pen) of a predetermined color before the document is read by a scanner or the like, thereby performing an image editing process (for example, trimming and masking) to the marked or area-specified image.

In addition, Japanese Patent Laying-Open No. 5-211600 discloses an apparatus in which colors of a plurality of color markers and the image editing process corresponding to each of the colors are registered in advance such that the user can select the editing process by choosing the color.

However, there have been the following problems (1) to (4) in such image processing apparatuses.

(1) In the conventional image processing apparatus in which image editing process is performed using a marker, the result of editing could be known only after copy output by a printer.

(2) In the conventional image processing apparatus in which an area to be edited is specified by a marker, when the edited result is not what the user of the apparatus had expected, the user had to specify the area in the document to be edited once again by a marker.

(3) In addition, in the conventional image processing apparatus in which an area to be edited is specified by a marker, the content of editing corresponding to the color of the marker had to be specified separately by the user, which had been troublesome for the user.

(4) Among a plurality of editing processes, the editing process desired may differ from user to user such that a standard process memorized by the apparatus would be of no use since it often is not what the user desired.

SUMMARY OF THE INVENTION

Based upon the foregoing, an object of the present invention is to make the a conventional image processing apparatus to be used more conveniently.

In order to achieve the above-described object, according to one aspect of the present invention, the image processing apparatus includes a detector for detecting an area which is indicated by a mark provided on a document, an editing processing unit for editing the image data within the area detected by the detector, and a display for displaying an image data performed the editing process.

In accordance with the present invention, the image data obtained after editing process is performed to the image data within the marked area can be displayed on the display. Accordingly, the user of the apparatus can check the output result of the edited image data on the display before it is printed out so as to prevent an image subjected to undesired editing from being output from the printer.

In accordance with another aspect of the present invention, an image processing apparatus includes a scanner for scanning a document having an area which is indicated by a mark, a detector for detecting the position of the area from the image data obtained by the scanner, an editing process unit for performing editing process to the image data within the area, and a display which can display the image data obtained by the scanner as well as an image data performed the editing process.

In accordance with the present invention, since the image data obtained from the scanner can be displayed on the display, the user of the apparatus can check the range (area) specified by the marker easily, and thus the apparatus would be utilized more conveniently. In addition, since it is also possible to check which color of the marker is used for the specification, the convenience of the apparatus is further improved.

More preferably, the image processing apparatus has a display switching unit for switching to the display. The display switching unit performs switching between the display of image data obtained by the scanner and the image data performed editing process.

In accordance with the present invention, switching is performed between display of image data after editing. process on the display and display of image data obtained by the scanner on the display such that unnecessary displaying is eliminated, thereby making the apparatus more convenient.

More preferably, the image processing apparatus includes a determination unit for determining the number of areas which are indicated by a mark provided on a document.

Still more preferably, the image processing apparatus inhibits display of image data on the display when the determination unit determines that the number of areas is smaller than a predetermined number.

In accordance with the present invention, when the number of marked areas in the document image is small, it may be considered that there is little need of checking the state obtained after editing process, and thus display of document image after editing process on the display is inhibited. Accordingly, efficiency of printing output of the document image is improved, such that the apparatus can be used more conveniently.

More preferably, the image processing apparatus includes a determination unit for determining the number of colors of the mark provided the document.

Still more preferably, the image processing apparatus inhibits the display of image data on the display when the number of colors of the mark is smaller than a predetermined number.

In accordance with the present invention, when the number of colors of the mark used for specifying the areas to be edited in the document image is small, it may be considered that there is little need of checking the state obtained after editing process, and thus display of document image after editing process on the display is inhibited. Accordingly, efficiency of printing output of the document image is improved, such that the apparatus can be used more conveniently.

More preferably, the image processing apparatus includes a changing unit for changing the correlation between the plurality of marker colors and the editing processes preset for each of the marker colors.

In accordance with the present invention, the user can change the correlation between each of the marker colors and the editing process, and thus the apparatus is used more conveniently.

More preferably, the image processing apparatus includes a document conveying device for setting the document on the platen to read the document image by the scanner, and then discharging the document from the platen.

Still more preferably, the image processing apparatus inhibits displaying of image data on the display when the document conveying device is in use.

In accordance with the present invention, when the document conveying device is in use, it is often desired that completion speed of the document image forming operation is made higher, and thus display of image data on the display is inhibited. Accordingly, efficiency of printing output is improved, and the apparatus can be used more conveniently.

More preferably, the image processing apparatus includes an area adding unit for adding an area to be edited on the display on which the image data is displayed.

In accordance with the present invention, it is made possible to set a new area intended to be edited in addition to the marked area, and thus the apparatus is used more conveniently.

More preferably, the image processing apparatus includes an area correction unit for correcting the area to be edited on the display on which the image data is displayed.

In accordance with the present invention, the user of the apparatus can correct the area to be edited on the display such that the apparatus is used more conveniently.

In accordance with still another aspect of the present invention, an image processing apparatus includes a memory for storing the correlation between a plurality of marker colors and the editing process set for each of the marker colors, and a printer for printing out a list of correlation between the plurality of marker colors stored in the memory and the editing process set for each of the marker colors.

In accordance with the present invention, a list of correlation between the plurality of marker colors and the editing process set for each of the marker colors is printed out as a sample. Accordingly, even when there is a slight difference between the color displayed on the display and the real color, the user can check the color close to the real printed out color, and thus the apparatus is used more conveniently.

More preferably, the image processing apparatus includes a changing unit for changing the correlation between the plurality of marker colors and the editing process set for each of the marker colors.

In accordance with the present invention, the user of the apparatus can change the correlation between the plurality of marker colors and the editing process corresponding to each of the marker colors arbitrarily and thus the apparatus is used more conveniently.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 shows an example of the content of document reading memory 109 and the read document.

FIG. 7 illustrates a specific example of the content of display memory 114 and content stored in editing memory 117.

DESCRIPTION OF THE PREFERRED EMBODIMENTS

Figure 1:
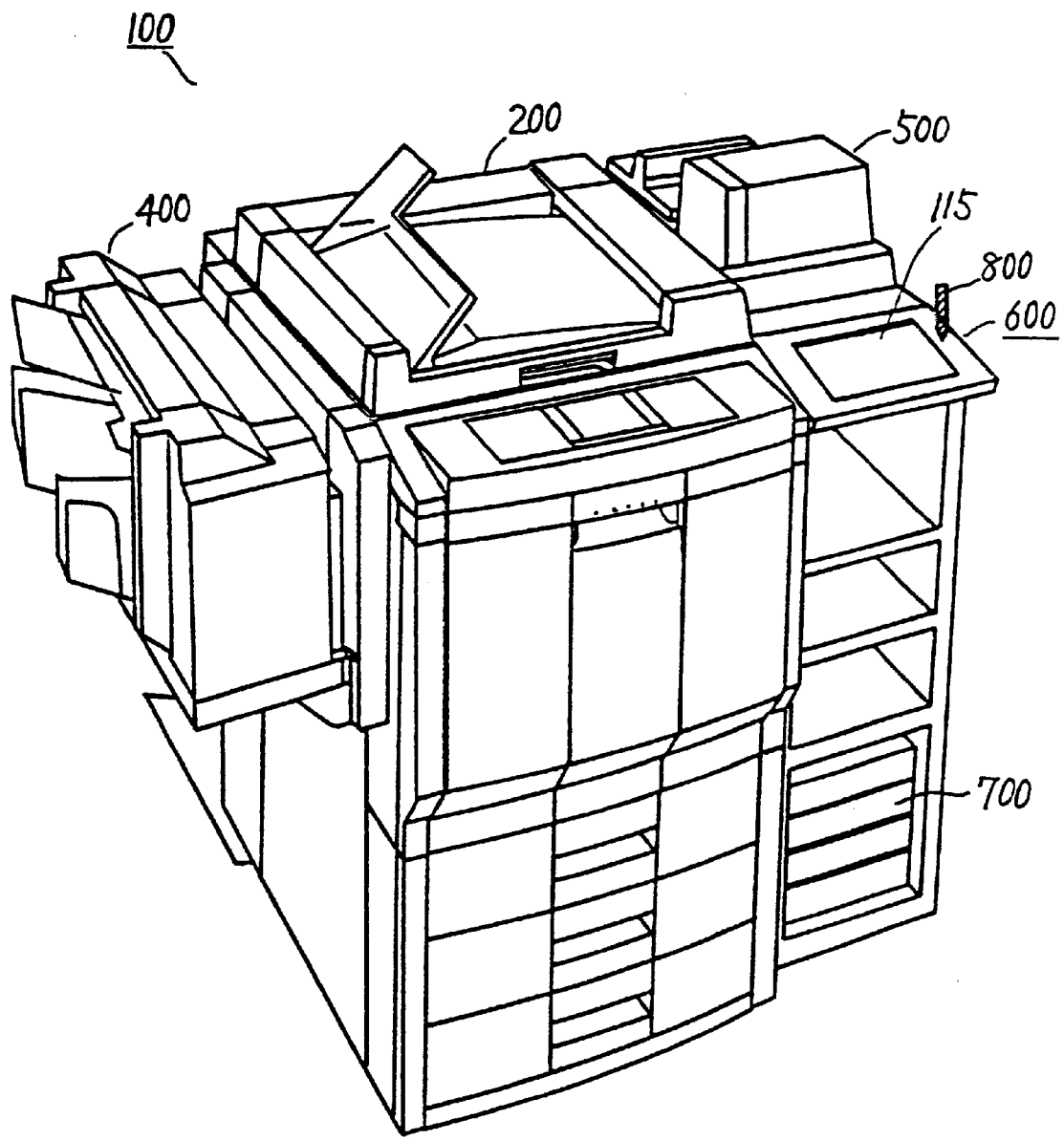
FIG. 1 is a perspective view showing the appearance of a photocopier of one embodiment of the present invention.

Preferred embodiments according to the present invention will now be described in detail with reference to the drawings, in which the same reference characters denote the same or corresponding portions.

Referring to FIG. 1, a color photocopier 100 includes an auto document feeder (or ADF) 200 for conveying a large amount of documents successively onto a platen and for discharging them automatically from the platen out of the machine after their images are read, a sorter 400 for sorting the paper for photocopying, a film projector 500 for copying an image from a film document, a screen editor 600 characteristic in the photocopier according to the present embodiment, and a printer controller 700 for using this photocopier as a color printer by connecting it to a personal computer or an EWS (workstation).

Screen editor 600 includes a liquid crystal display (LCD) 115 on which a menu for various operations is displayed for giving instructions of operations to the user.

In addition, on this color LCD 115, a transparent tablet is stacked for detecting the coordinates designated by the user, and by an input by the user with a pen 800, the coordinates on color LCD 115 can be input directly to the apparatus.

Figure 2:
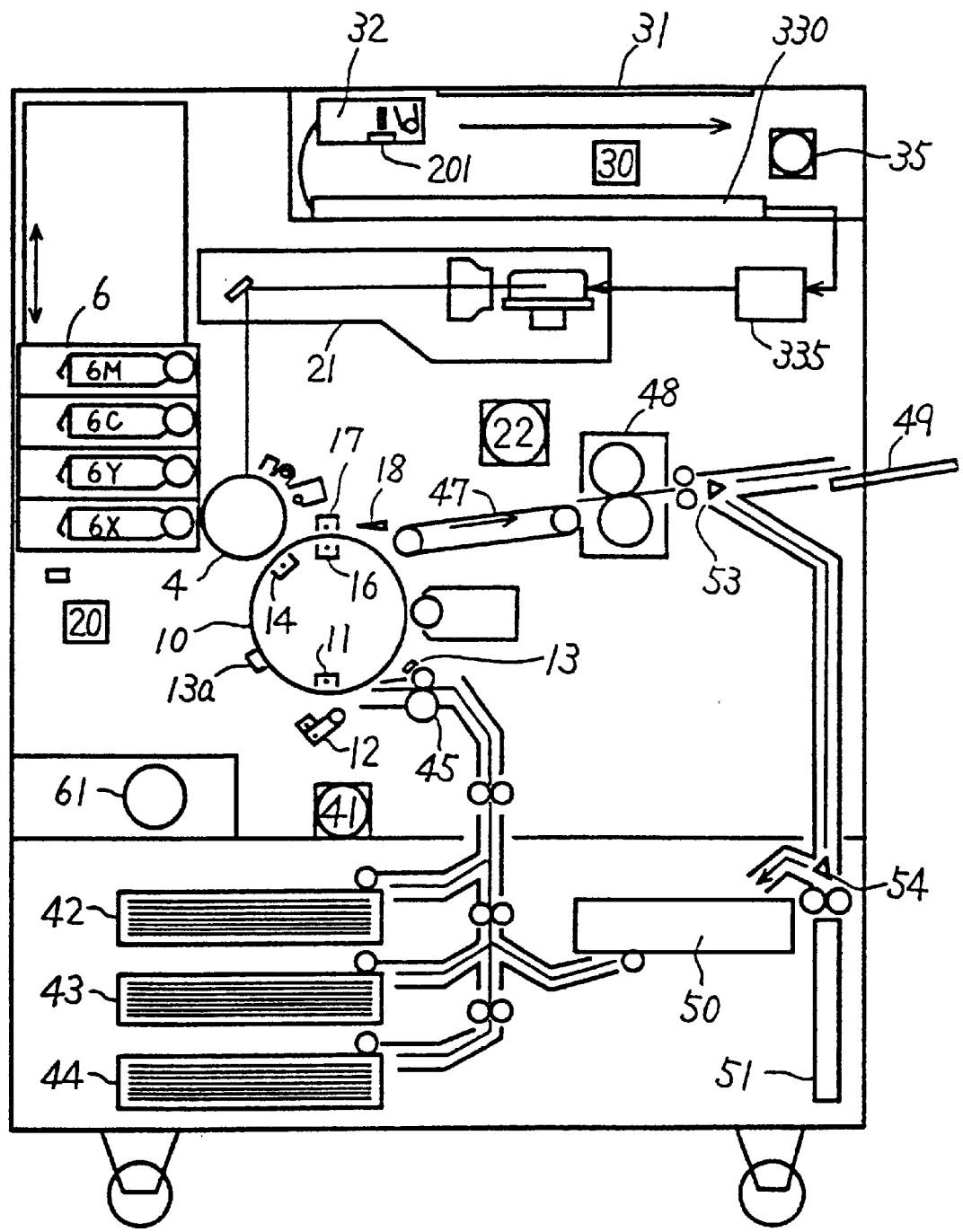
FIG. 2 is a front cross sectional view of the photocopier of FIG. 1.

FIG. 2 is a cross sectional view for illustrating the mechanism of the color photocopier shown in FIG. 1.

Referring to FIG. 2, the photocopier is generally comprised of image reader portion 30 and printer portion 20. Each of these portions will be described in the following.

(1) Image Reader Portion 30

Image reader portion 30 includes a platen 31 for stacking a document thereon, a scanner 32 for scanning the document with exposure light, an image sensor (CCD) 201 for sensing the reflected light from the document, a image signal processing portion 330 for processing signals from image sensor 201, a print head (PH) controlling portion 335 for providing a control signal to the printer portion in accordance with the signal from image signal processing portion 330, and a pulse motor 35 for driving scanner 32.

The image of the document placed on platen 31 is scanned with exposure light by scanner 32, and the light reflected from the image is photoelectrically converted by image sensor 201. The photoelectrically converted signal is subjected to a predetermined process at image signal processing portion 330 so as to produce digital image data to drive laser diode. The produced digital image data is transmitted to print head controlling portion 335.

(2) Printer Portion 20

Printer portion 20 is generally formed of an image creating portion, a developing unit portion, and a paper processing portion. Details thereof are given separately in the following.

(a) Image Creating Portion

The image creating portion includes a laser device 21 driven in accordance with the digital image data transmitted from image reader portion 30, a photosensitive drum 4 for writing electrostatic latent image, a developing unit 6 for developing by a toner, a transfer drum 10 for transferring the image onto the surface of the paper, and a drum driving motor 22 for driving the photosensitive drum and the transfer drum.

Laser device 21 is driven by the input digital image data and the like. Laser device 21 being driven causes formation of electrostatic latent image on the surface of photosensitive drum 4. The electrostatic latent image is toner-developed by developing unit 6, and is transferred onto the surface of the paper for printing placed on the transfer drum.

At this time, photosensitive drum 4 and transfer drum 10 are driven in synchronization by driving motor 22.

(b) Developing Unit 6

Developing unit 6 includes a magenta developer 6M for development by a magenta toner, a cyan developer 6C for development by a cyan toner, a yellow developer 6Y for development by a yellow toner, a black developer 6K for development by a black toner, four toner hoppers for supplying the toner of the corresponding color to each of the developers, and a developing unit motor 61 for moving developing unit 6 in a vertical direction.

(c) Paper Processing Portion

The paper processing portion includes housing cassettes 42 to 44 for putting in the papers for printing, and an intermediate housing portion 50 for temporarily putting in the papers.

A paper drawn out from any one of the housing cassettes 42 to 44 or supplied from intermediate housing portion 50 is conveyed to transfer drum 10 by a group of conveying rollers and is rolled onto transfer drum 10. Thereafter, toner images (of 4 colors at most) on photosensitive drum 4 are successively transferred onto the paper.

The paper on which images are transferred is then separated from the transfer drum 10, subjected to image fixation by a fixing device 48, and is discharged at a discharge tray 49.

It may be noted that the apparatus is provided with a timing roller pair 45 for taking resist timing when the paper is conveyed, and a conveying belt 47.

The above described group of rollers, conveying belt 47 and the like are driven by a main motor 41.

In addition, in transfer drum 10, a tip chuck claw for chucking the tip of the paper, an adsorption charger 11 for electrostatical adsorption of the paper to transfer drum 10, a paper clamping roller 12 for clamping the paper, a transfer charger 14 for causing the toner image appearing on the photosensitive drum to be sucked and transferred onto the paper, dischargers 16, 17 for discharging from the transfer drum to separate the paper, and a separation claw for peeling off the paper from the transfer drum.

To intermediate housing portion 50, the paper which has once gone through the printing process as described above is introduced.

Whether the paper which has once gone through the printing process is conveyed to discharge tray 49 or to intermediate housing portion 50 is chosen by switching a conveying route switching portion 53 disposed in the conveying route of the paper already subjected to fixing process.

Within the conveying route to intermediate housing portion 50, a conveying route switching portion 54 is further disposed. By conveying route switching portion 54, selection is made on whether the conveyed paper is put in intermediate housing portion 50 after switch-back conveyance with an inversion device 51 or is put directly into intermediate housing portion 50.

This selection is made in order to select whether the image is transferred on the same side of the paper on which printing is done already when the paper supplied from intermediate housing portion 50 is conveyed again to the transfer drum (a mode in which such transfer is performed being reffered to as "image overlapping miode"), or is transferred on the rear side (in a mode similarly reffered to as "both-sides copying mode").

On the transfer drum, a reference location sensor 13 for detecting the reference location of the transfer drum, and an actuator pklate 13a for actuating the reference location sensor are further disposed.

Operations of the above-described image reader portion 30 and printer portion 20 are described further hereinbelow.

Figure 3:
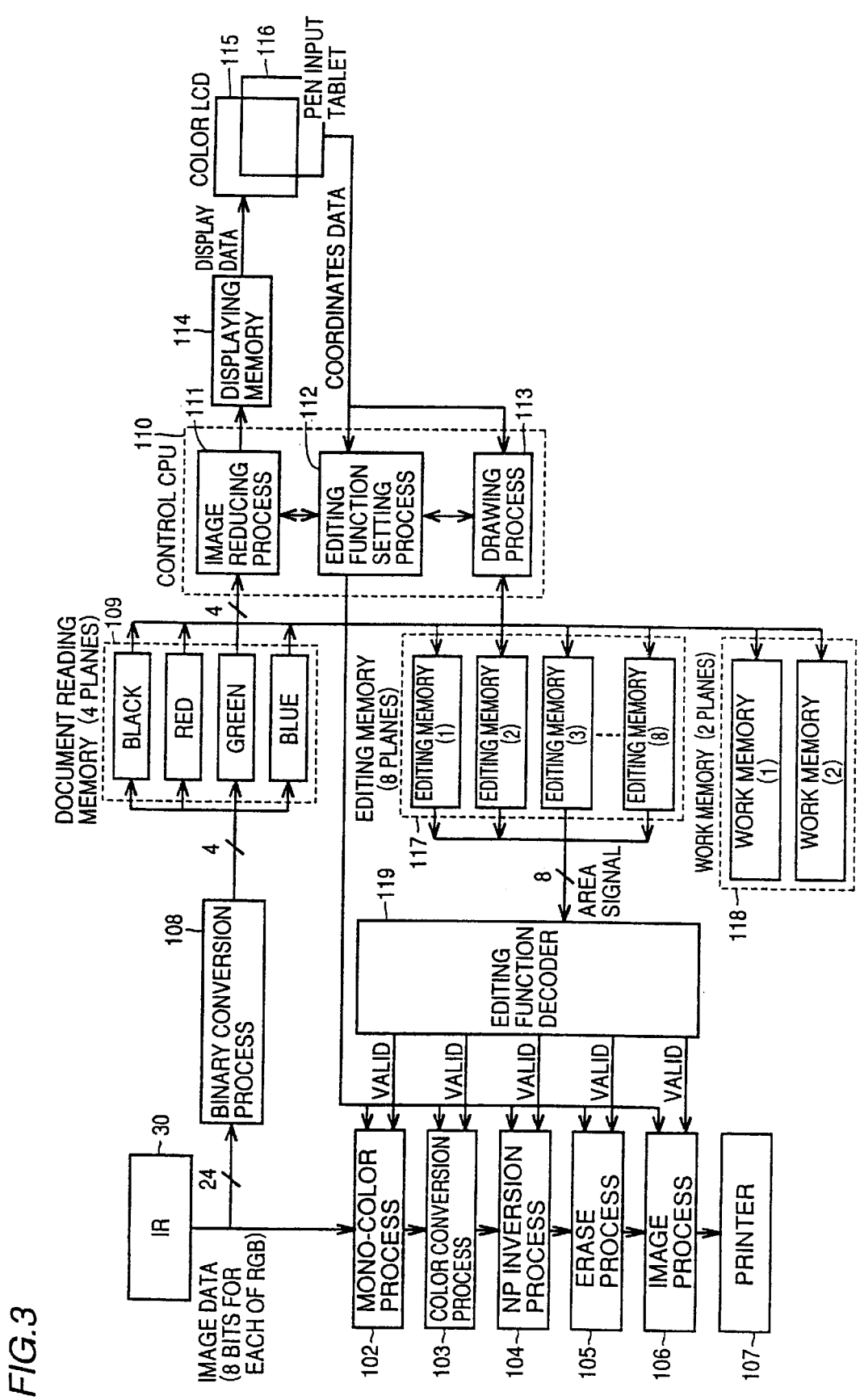
FIG. 3 is a block diagram of an electronic circuitry of the photocopier shown in FIG. 1

FIG. 3 is a block diagram of an electronic circuitry for image processing provided to the photocopier of FIG. 1.

Referring to FIG. 3, the electronic circuitry for image processing includes an image reader (hereinafter also referred to as "IR" and which corresponds to image reader portion 30 in FIG. 2.) 30, a mono-color processing portion 102 for performing mono-color processing in which the image data (8 bits for each of RGB) obtained by IR 30 are replaced by a mono-color image data, a color conversion processing portion 103 for color conversion process in which image data of a specific color in the signals output from mono-color processing portion 102 are replaced by another color, an NP inversion processing portion 104 for inverting the NP (negative/positive) of the signal output from color conversion processing portion 103, an erase processing portion 105 for partially erasing the signals output from NP inversion processing portion 104, an image processing portion 106 for other image processes, and a printer 107 (printer portion 20 in FIG. 2) for printing out the image data output from image processing portion 106.

In addition, the circuitry includes, as a block for editing, a binary conversion processing portion 108 for rendering the image data output from IR 30 into binary data, a document reading memory 109 for storing the binary image data separated into data of each of the colors including black, red, green and blue, a control CPU 110 for controlling the read image and the output image, a display memory 114 for recording the content of the data displayed on color LCD 115, color LCD 115, a pen input tablet 116 loaded on color LCD 115, an editing memory 117 employed for editing the image data consisting of memory for eight image planes, a work memory 118 of memory for two image planes forming a working area, and an editing function decoder 119 for controlling which of mono-color processing portion 102, color conversion processing portion 103, NP inversion processing portion 104, erase processing portion 105 would be made effective in accordance with data recorded in editing memory 117.

Control CPU 110 includes an image reduction processing portion 111 for reducing the size of the image to display the read document on color LCD, an editing function set processing portion 112 for setting the editing function in accordance with the coordinates data input from the pen input tablet, and a drawing processing portion 113 for drawing the outline of the area to be edited also in accordance with the input coordinates data.

Description will now be made for the process flow in the block diagram of FIG. 3. In general, there are two types of process flows. One is a flow in a mode in which document is read and displayed on the color LCD (hereinafter referred to as "document display mode"), and the other is a flow in a mode in which the read image data is printed directly by printer 107 (hereinafter referred to as "copy mode").

In document display mode, the image data read by IR 30 is displayed on color LCD 115 via binary conversion processing portion 108, document reading memory 109, control CPU 110, and display memory 114.

Meanwhile, in copy mode, the image data read from IR 30 is output to printer 107 via mono-color processing portion 102, color conversion processing portion 103, NP inversion processing portion 104, erase processing portion 105 and image processing portion 106.

In document display mode, the digital image data output from IR 30 is rendered into binary data by binary conversion processing portion 108. The digital image data is a full-color image data of 8 bits, 400 DPI (dot-per-inch) for each of R, G, B. Since a large memory capacity is required to store these data in the memory, the digital image data output from IR 30 is rendered into binary data by binary conversion processing portion 108 and has its resolution lowered from 400 DPI to 100 DPI. In this way, amount of information is reduced.

Then, the data rendered into binary data is stored in document reading memory 109. Document reading memory 109 is formed of a structure including four planes. One of them is a plane of memory for the color black. The plane of memory for black stores the black portion of the document image (that is, the monotone image itself). The remaining three planes are for red, green and blue, and these three planes (3 bits) can indicate information for eight colors. Here, the planes of memory for red, green and blue stores colored figures indicated by color markers of up to six colors except for white and black.

Thereafter, the image data stored in image reading memory 109 is sent to image reduction processing portion 111 inside control CPU 110 so as to reduce the resolution further.

This reduction in resolution is performed because, while the image data in document reading memory 109 has a resolution of 100 DPI, the image displayed by color LCD 115 is about 30 to 50 DPI (the resolution differing depending on the size of the image to be displayed), such that further reduction in the size of the image is required.

The image data reduced by image reduction processing portion 111 is stored in display memory 114.

The image data stored in display memory 114 is directly displayed on color LCD 115.

On color LCD 115, pen input tablet 116 is stacked.

User can select the operation menu or newly specify the-edited area easily by inputting with the pen on pen input tablet 116.

In particular, the user can perform the operation in an interactive manner owing to operation menu being displayed on color LCD 115 in accordance with the coordinates data input by pen input tablet. In addition, by outputting a plurality of operation menus successively on color LCD 115, the operator can select a desired mode from hierarchically formed modes.

Then, the instructions are processed by editing function set processing portion 112 and drawing processing portion 113 included in CPU 110.

In editing function set processing portion 112, process is performed in an image editing mode (of process according to the color of the marker) determined by the user. A setting signal is transmitted from editing function set processing portion 112 to mono-color processing portion 102, color conversion processing portion 103, NP inversion processing portion 104 and erase processing portion 105, thereby performing various types of operations to the digital image data output from IR 30.

In drawing processing portion 113, process is performed to image editing area (that is, the area encircled by the marker) determined by operation by the user. Drawing processing portion 113 sets the edited area of the image using editing memory 117 and work memory 118.

The eight planes included in editing memory 117 each corresponds to one editing function (image editing mode), respectively. On each of these planes of the editing memory, a figure is drawn in which the area specified by the user is colored completely. More specifically, only the area of the completely colored figure recorded in editing memory 117 is subjected to image editing.

Editing function decoder 119 inputs an area signal (also referred to as editing area valid signal) according to the figure recorded in these planes of editing memories 117, and in accordance with the input area signal, determines which of the processing portions among mono-color processing portion 102, color conversion processing portion 103, NP inversion processing portion 104 and erase processing portion 105 is allocated.

Editing function decoder 119 outputs a valid signal for allowing editing function required for the edited area needed for the editing processing portions allocated.

More specifically, signal is output to editing function decoder 119 in accordance with area signal indicating inside and outside the edited area developed by the editing memory 117, such that valid/invalid is set for each of the pixels and process is carried on so that appropriate setting of the edited area is possible as specified by the user.

At this time, work memory 118 of two planes is employed as memory for working upon drawing process to editing memory 117.

The data subjected to image processing is output onto the paper as a color image according to electrostatic latent image scheme by printer 107.

In the photocopier according to the present embodiment, by the user encircling the desired area of a monotone document with markers of colors such as red, green and blue, the image of the area encircled by the marker is, after the document is read by the image reader of the photocopier, edited as set corresponding to the color of the marker having that color.

As the content of the editing process, for example, hatching is done on the image within the area encircled by the red marker, color editing (e.g., to render the image into blue image) is performed on the image in the area encircled by the green marker, and reduction in size is performed on the image in the area encircled by the blue marker.

Referring to FIG. 6A, description will be given in the following on the process performed when there are areas in portions of the document which are encircled by red (R), green (G) and blue (B) markers.

First, the document is read by image reader 30 and rendered into binary data by binary conversion processing portion 108. Thereafter, the data are stored in document reading memory 109.

At this time, in document reading memory 109, only the data for black and white portions of the document are stored at plane 109K where black data are to be stored, as shown in FIG. 6B. Here, since the document used in the present embodiment is a monotone document (not including any colors), all of the image data are stored in plane 109K.

Meanwhile, at planes 109R, 109G and 109B where red, green and blue data are to be stored respectively, the shapes of the markers on the document themselves are stored. That is, plane 109R stores the shape of the area encircled by the red marker, plane 109G stores the shape of the area encircled by the green marker, and plane 109B stores the shape of the area encircled by the blue marker.

At this time, selection is made on whether the document read by image reader 30 is displayed with markers by the markers still appearing thereon (marker display mode) or the image after image editing is performed on the area encircled by the marker is displayed (edited display mode) in accordance with the setting by the user of the apparatus, for example, by input from the key and icon provided on the display portion or automatic determination by the apparatus.

Here, when the marker display mode is selected, data of all planes of document reading memory 109K to 109B are transferred to display memory 114 via control CPU 110, and then is displayed on color LCD 115. This displayed state is shown as image plane 114M of FIG. 7(A).

Meanwhile, when edited display mode is selected, image after image editing is performed in accordance with the colors of the markers and the locations of the markers is displayed, as shown by image plane 114S of FIG. 7(A).

In a state in which image plane 114M of marker display mode is displayed on LCD 115, the user can further add and correct the marker areas by input with a pen via pen input tablet 116. For example, the user can newly add areas (1) and (2) to the state shown in 114M of FIG. 7(A) to obtain image plane 114T, via tablet 116.

More specifically, the user can check the states before and after image editing process is performed, and in addition, can newly add/correct the marker areas for image editing process via tablet 116, and thus the apparatus is used more conveniently.

In each of the planes in editing memory 117 shown in FIG. 7(B), figures indicating the areas to be edited which has been set by user's marking by the markers or input from the tablet are stored.

For example, assume that areas to be edited is set as shown in image plane 114T of FIG. 7(A). At this time, referring to FIG. 7(B), the area encircled by red marker (R) on the monotone document is stored in the first plane 117(1) of editing memory with its inner portion completely colored.

Similarly, in the second plane 117(2) and the third plane 117(3) in the editing memory, areas encircled by green (G) and blue (B) are stored, respectively, in a completely colored state.

In addition, in the fourth plane 117(4) of the editing memory, a portion (1) which is newly input from tablet 116 is written with its inner region completely colored, and in the fifth plane 117(5), a portion of (2) input from tablet 116 is stored with its inner region colored completely.

Editing function decoder 119 recognizes these areas having their inner region colored completely, thereby identifies these areas as areas to be subjected to image editing, and outputs valid signals to each of the processing portions 102 to 105.

Description will now be made for the actual procedure for the user to manipulate the photocopier in accordance with the present embodiment.

The user can set the combination of the color of the marker used to mark the document and the process corresponding to that color of the marker in an arbitrary manner.

Figure 8:
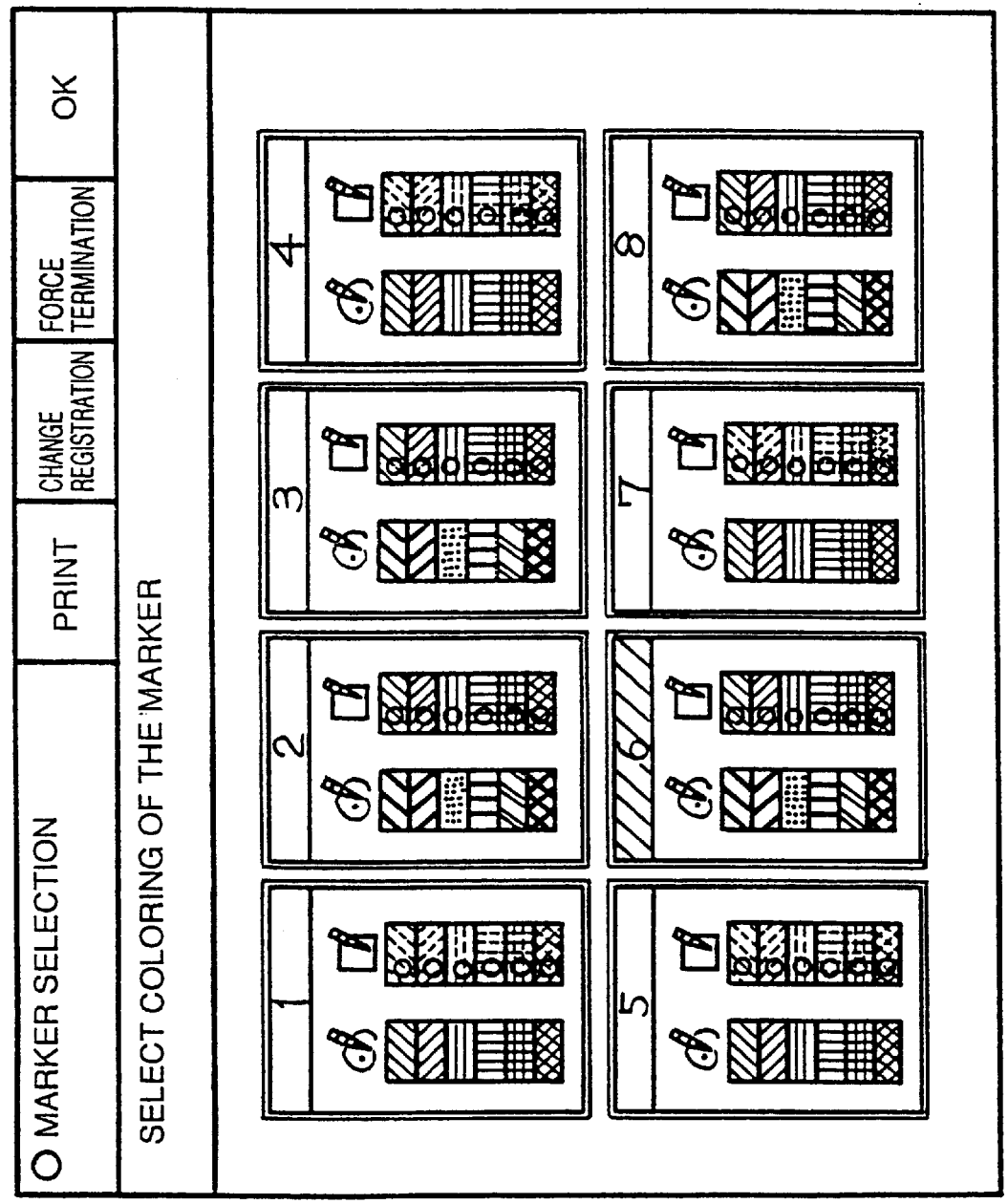
FIG. 8 shows an image plane for the user to select the relationship between a color of a marker and the process corresponding to the color.

The menu image plane for selecting the color of the marker and the process corresponding to that color is shown in FIG. 8. This menu image plane is displayed on color LCD 115.

Here, in the frames denoted by 1 to 8 of FIG. 8, six colors (e.g., blue, green, red, yellow, pink and brown) indicating the colors of the markers are shown in the left hand side, while the content of the editing process corresponding to each of the colors are shown in the right hand side.

More specifically, by selecting any of the frames 1 to 8 as desired, the operator can change the setting of the color of the marker and the corresponding editing process, which was difficult in the conventional art.

The content of the editing process corresponding to the color of the marker shown in the right hand side of the above-described frame may be indicated by characters and the like.

The relationship between the color of the marker and the corresponding editing process in the above-described frame can be changed and registered by the user arbitrarily. For example, hatching process preset as the editing process corresponding to the red marker can be changed to a process of different editing content like color editing. More specifically, by indicating the portion of "registration change" displayed in the upper portion of the image plane shown in FIG. 8, a manipulation image plane shown in FIG. 10 is displayed on color LCD 115.

Figure 10:
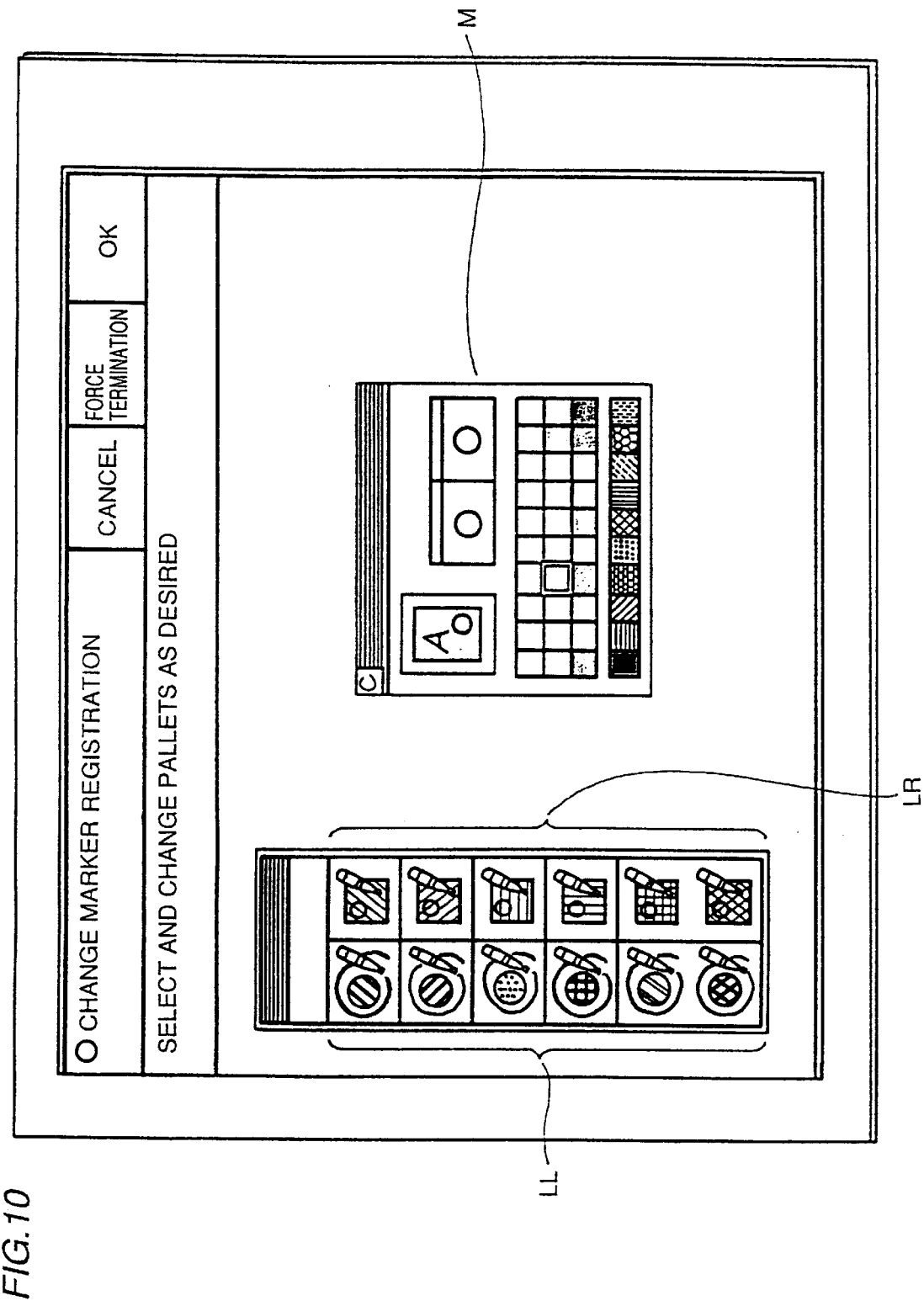
FIG. 10 shows an image plane for changing the relationship between the color of the marker and the process corresponding to the color.

In the image plane of FIG. 10, the left frame of the plane shows the color of the marker which can be subjected to change of registration at left hand side LL, and the right hand side LR of the same frame shows the content of the editing process corresponding to that color. It shows the currently registered six colors of the markers and the current content of the editing processes corresponding to them respectively.

In addition, at the center of the image plane, a menu M for changing the setting is displayed. From the six colors LL of the markers indicated in the left portion of the frame and the content of the corresponding editing processes LR, the user can choose the ones which he or she wants to change, and make a selection from menu M to effect the change.

If the changing process is completed, the user indicates the "OK" button displayed at the upper-right corner of the image plane by the pen such that the set content are registered to the apparatus, and the manipulation image plane of FIG. 8 will display the newly registered content instead of the former content.

Figure 9:
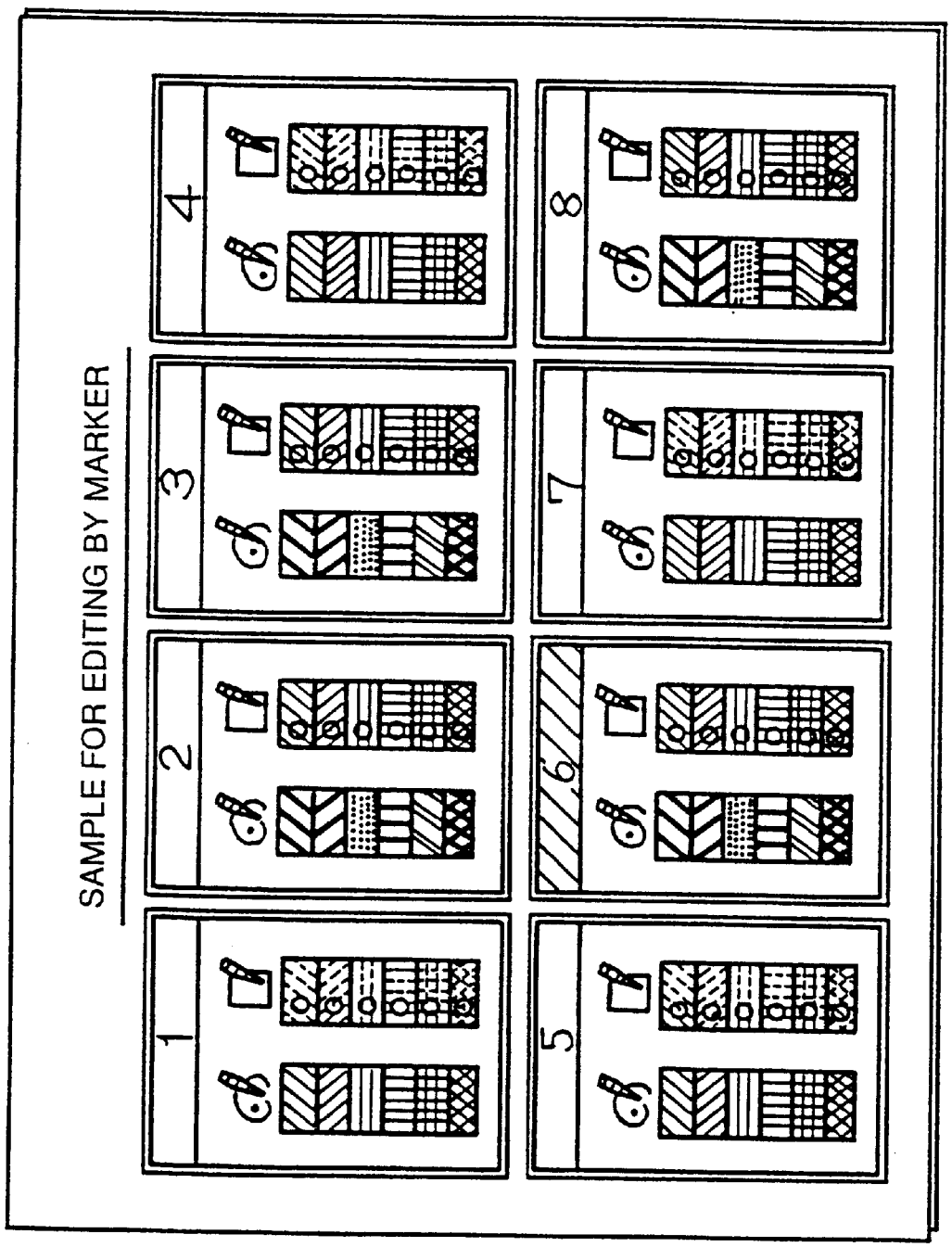
FIG. 9 shows the relationship between the printed-out color of the marker and the process corresponding to the color.

In addition, in the image plane of FIG. 8, by indication by the user of the "Print" button at the upper portion of the plane with the pen, a sample of marker editing as shown in FIG. 9 is printed out.

By looking at this sample, the user can know the colors of the markers and the editing processes corresponding to those colors even when not being near the photocopier. Accordingly, it is possible for the user to conveniently perform the work of coloring the document by the marker at his or her desk and the like.

There are slight difference in the tone of the result of editing between what is displayed on color LCD 115 as shown in FIG. 8 and what can be seen in print as shown in FIG. 9. This is because LCD 115 has lower resolution. Normally, the result in print can show the colors more closer to the real colors. In other words, by printing out the sample of the marker editing shown in FIG. 9, the user can know the relationship between the colors and the processes with colors more closer to the real colors.

Figure 11:
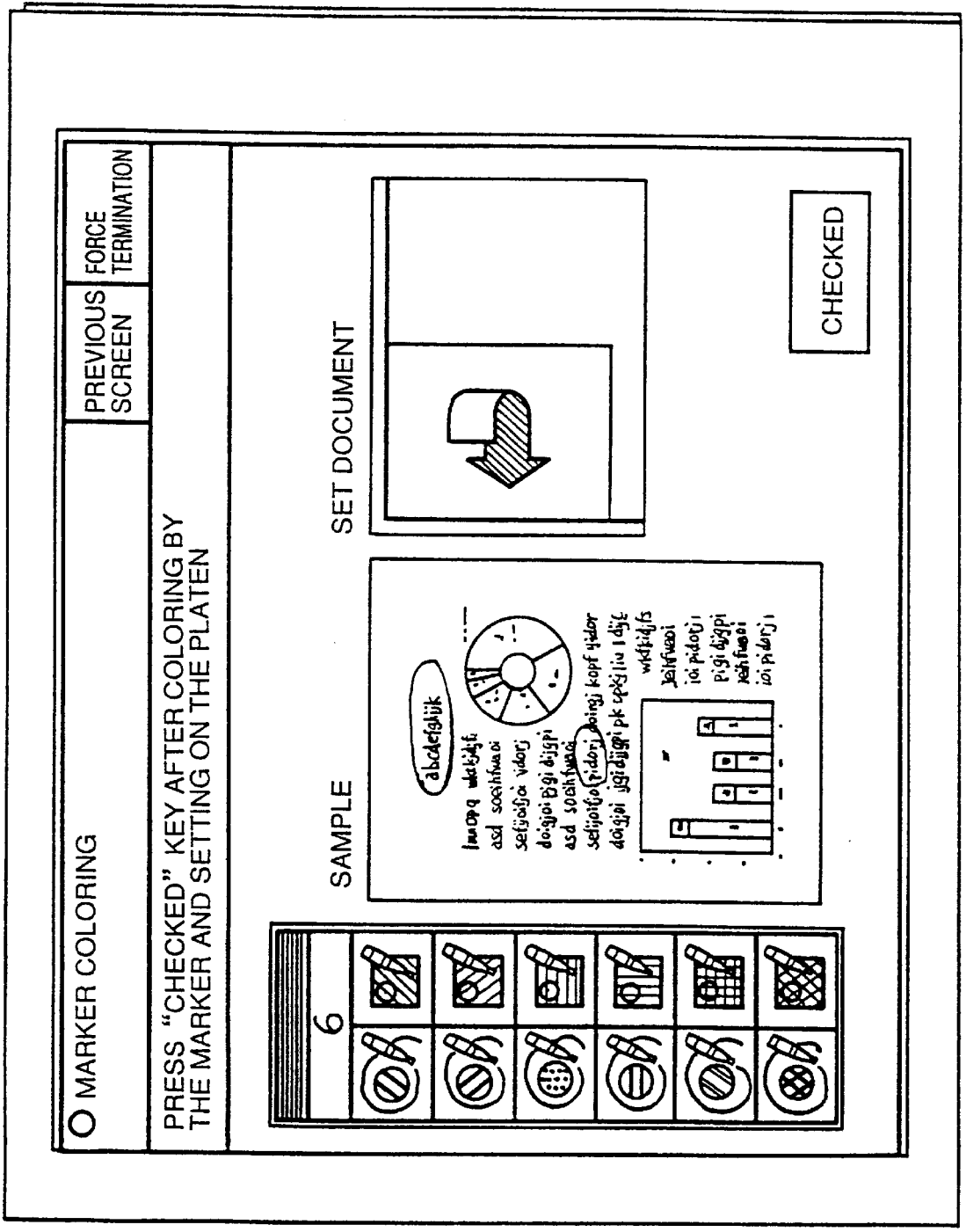
FIG. 11 shows an image plane for urging the user to set the documents.

By the user selecting either one of the marker editing types 1 to 8 in the image plane shown in FIG. 8 and then indicating the "OK" portion at the upper-right portion of the image plane by the pen, the plane shown in FIG. 11 is displayed on color LCD 115.

Referring to FIG. 11, the image plane shows the image indicating the selected color of the marker and the corresponding content of the editing process at the left hand side, a sample of the coloring performed on the document at the center, and how the document should be set to the platen at the right hand side.

After checking the displayed image plane of FIG. 11, the user sets the document and indicates the "checked" portion of the image plane at the lower right portion with the pen. Thus, image reader 30 starts reading the document.

Figure 12:
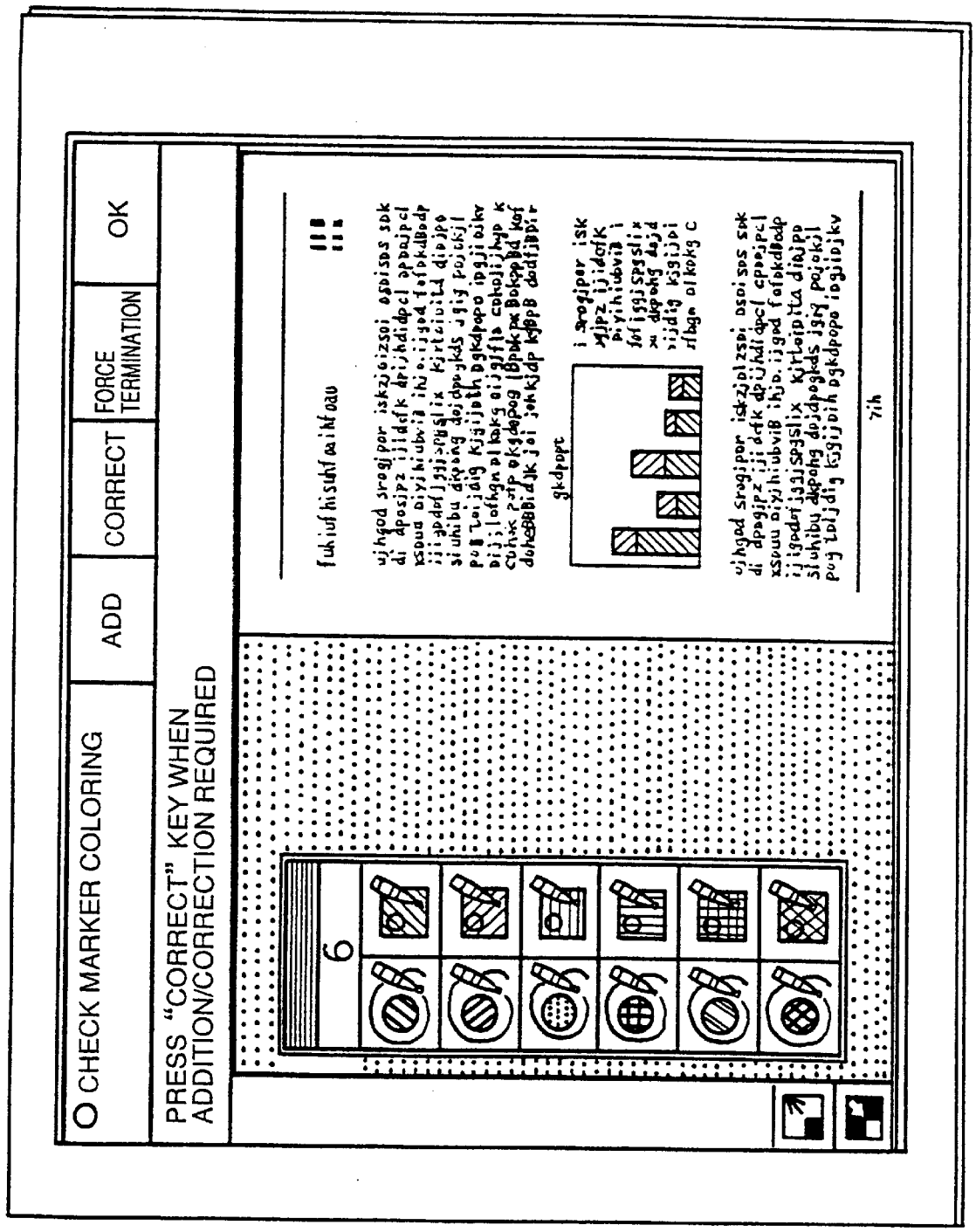
FIG. 12 shows an image plane on which the read document is displayed.

Then, when reading of the document is completed, an image plane shown in FIG. 12 is displayed on color LCD 115.

Referring to FIG. 12, the image plane displays the colors of the marker and the corresponding content of the editing process at its left, and the read document at its right.

As the document image displayed at the right hand side of the image plane, in addition to the image of the read document as it is (i.e., the image still having-markers), an image after being subjected to editing process by specification by the marker can also be displayed. The user can look at this document image after editing process so as to check to be sure that the editing with the specification by the marker is performed.

Figure 13:
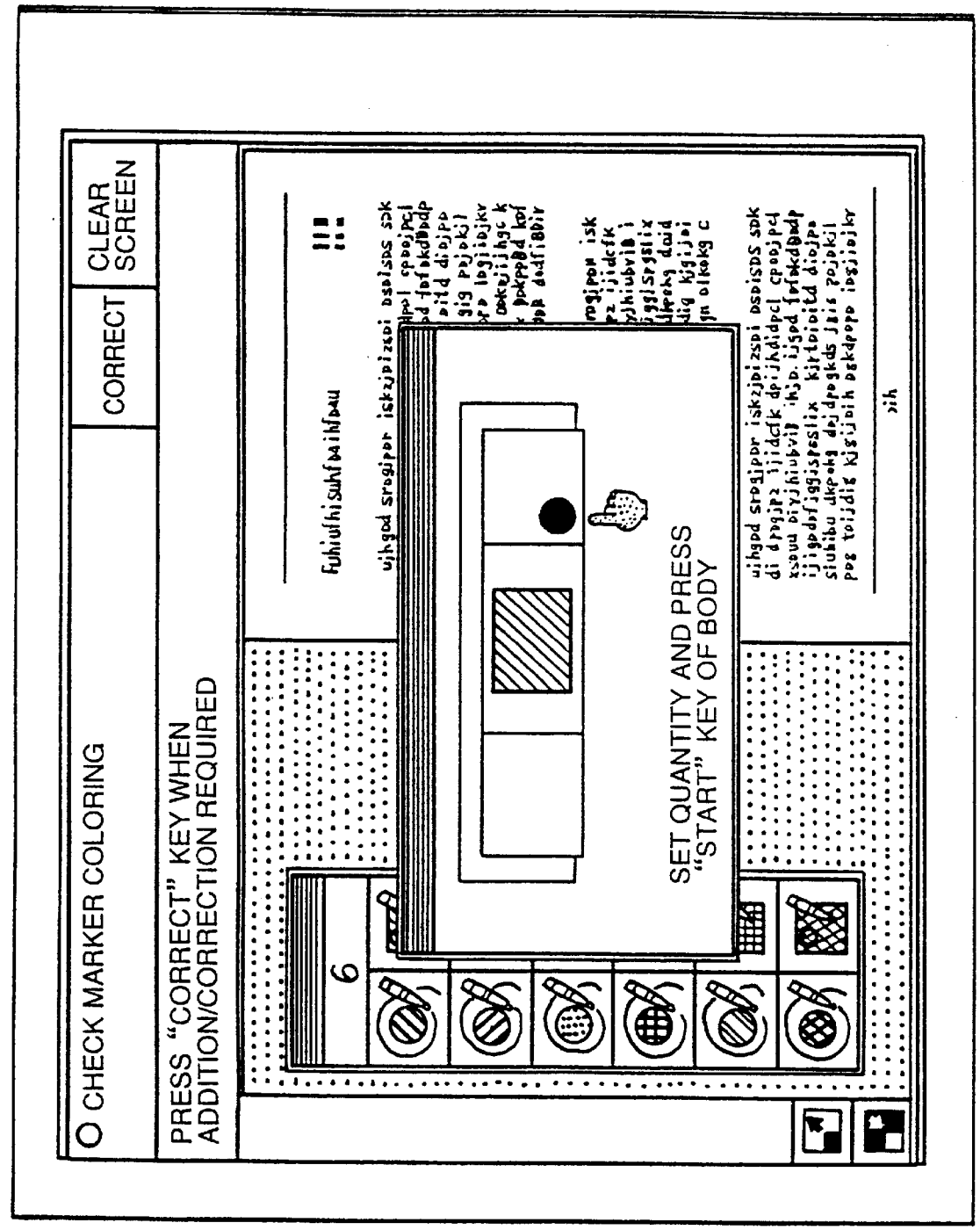
FIG. 13 shows an image plane for urging instruction from the user for copying.

After checking the displayed document image, the user presses the "OK" button at the upper right portion of the image plane if copying output can be performed at this state, and thus an image plane as shown in FIG. 13 is displayed on color LCD 115.

Regarding the image plane shown in FIG. 13, the user can set the number of copies required by a ten key and press the start key so as to obtain the copies of the document image processed according to specification by the marker.

Figure 14:
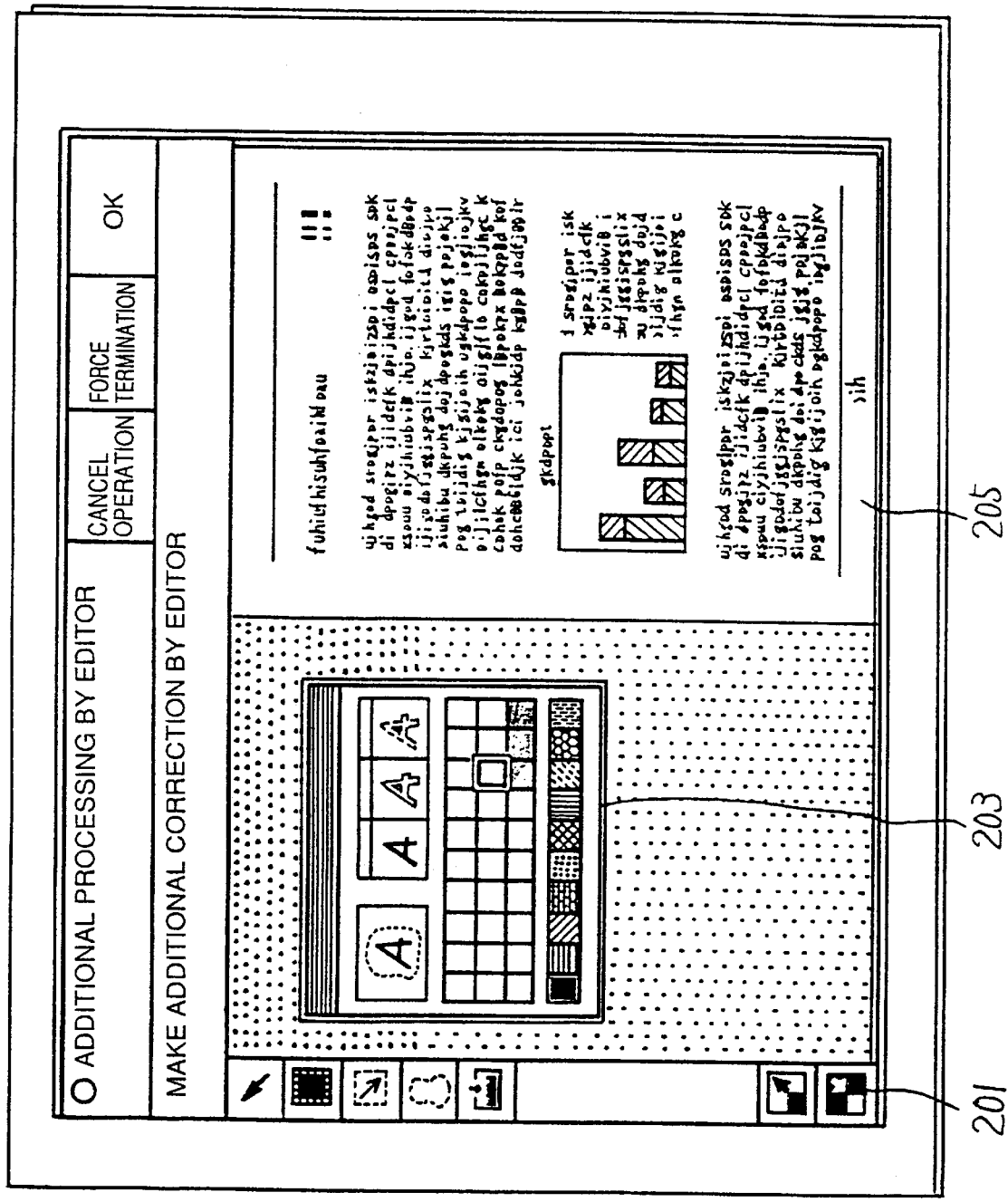
FIG. 14 shows an image plane for adding to or correcting the instruction by the marker on the display.

Meanwhile, in the image plane shown in FIG. 12, as a result of the user's check of the displayed document, if it happens that there is something wrong with the content of the editing process and the user wants to make corrections, indication of a "correct" button by the pen causes an image plane as shown in FIG. 14 to be displayed on the color LCD 115.

Referring to FIG. 14, the image plane shows an icon 201 at its left edge for various kinds of area specification, a menu 203 for specifying the editing process within the specified area at its right, and a read document 205 at the right hand side of the plane. The user can make changes and the like on the area and content of the editing process specified by the marker by pen input on color LCD 115 while checking the display thereof.

In the image plane shown in FIG. 12, as a result of the user's check of the displayed document, if it happens that the user wants to make further editing, the portion to be edited can be added by indicating an "add" button at the upper portion of the image plane by the pen.

Figure 15:
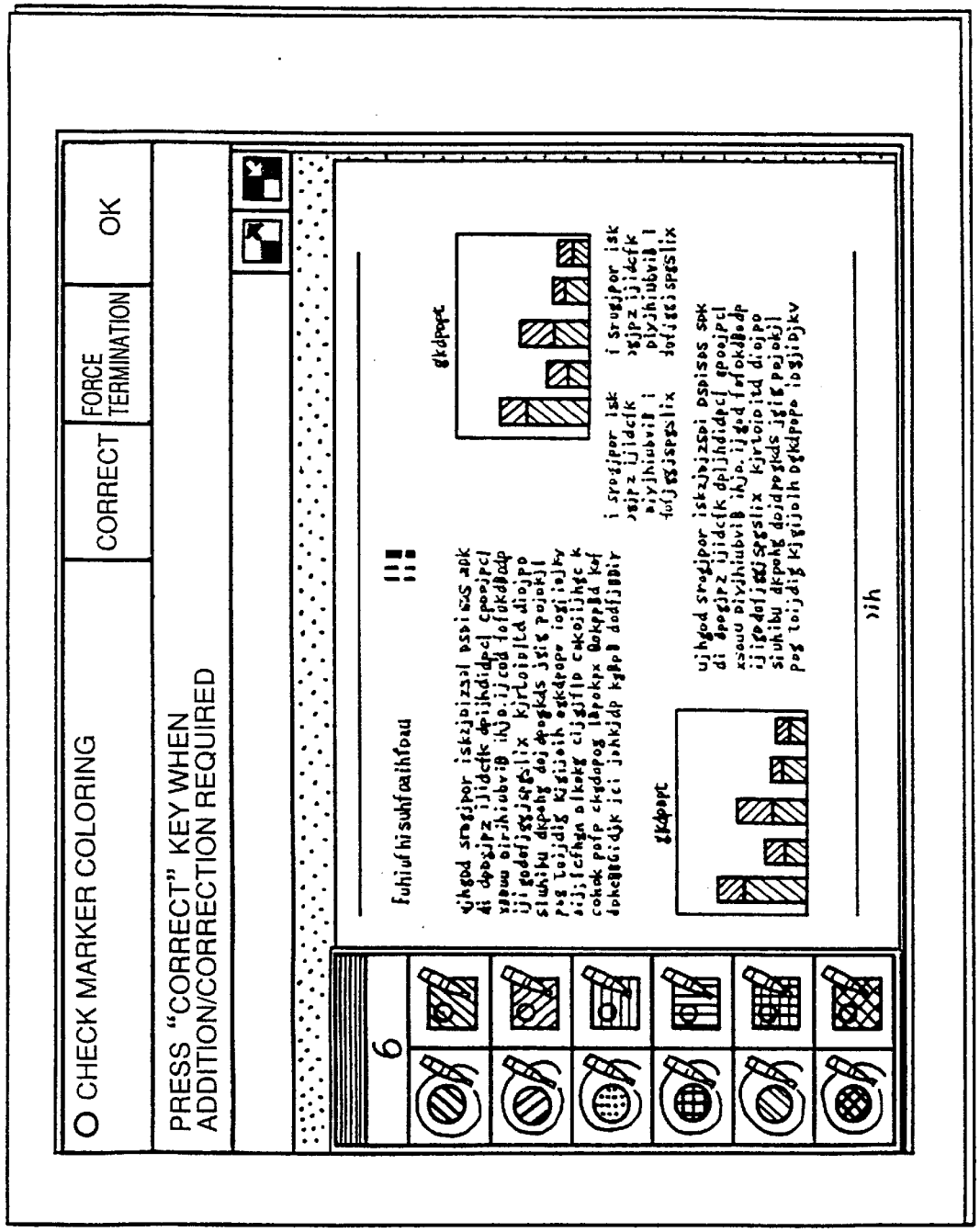
FIG. 15 shows an image plane in a state where a document laid to be longer in the lateral direction is read.
Figure 16:
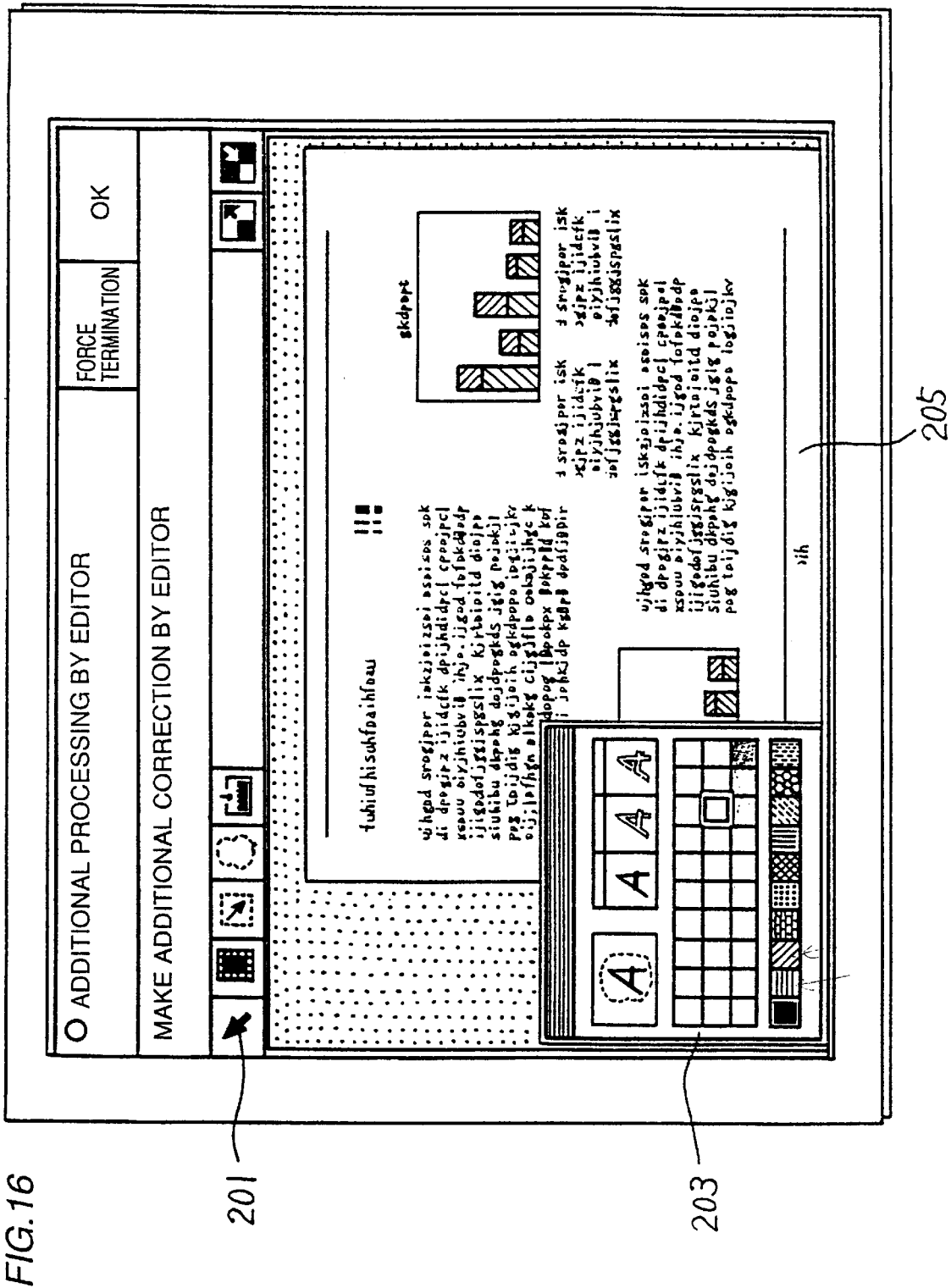
FIG. 16 shows an image plane for adding to or correcting the instructions by the marker in the case where a document laid to be longer in the lateral direction is read.

If the read document is laid in a landscape manner (i.e., longer in a lateral direction), a read document image plane shown in FIG. 15 and a corrected document image plane shown in FIG. 16 are output.

Specifically, positions where an icon 201 for area specification and menu 203 for specifying editing mode depends on whether the read document is laid to be longer in vertical or lateral direction.

In this way, by changing the displayed positions of the operation menu and the like corresponding to the orientation or direction of the document, the document can be displayed on color LCD 115 to be seen as large as possible.

Although manual switching of whether the document specified by the marker is displayed on the color LCD or not can be done at the side of the user as described above, it is also possible to automatically switch whether the document is displayed or not.

Figure 4:
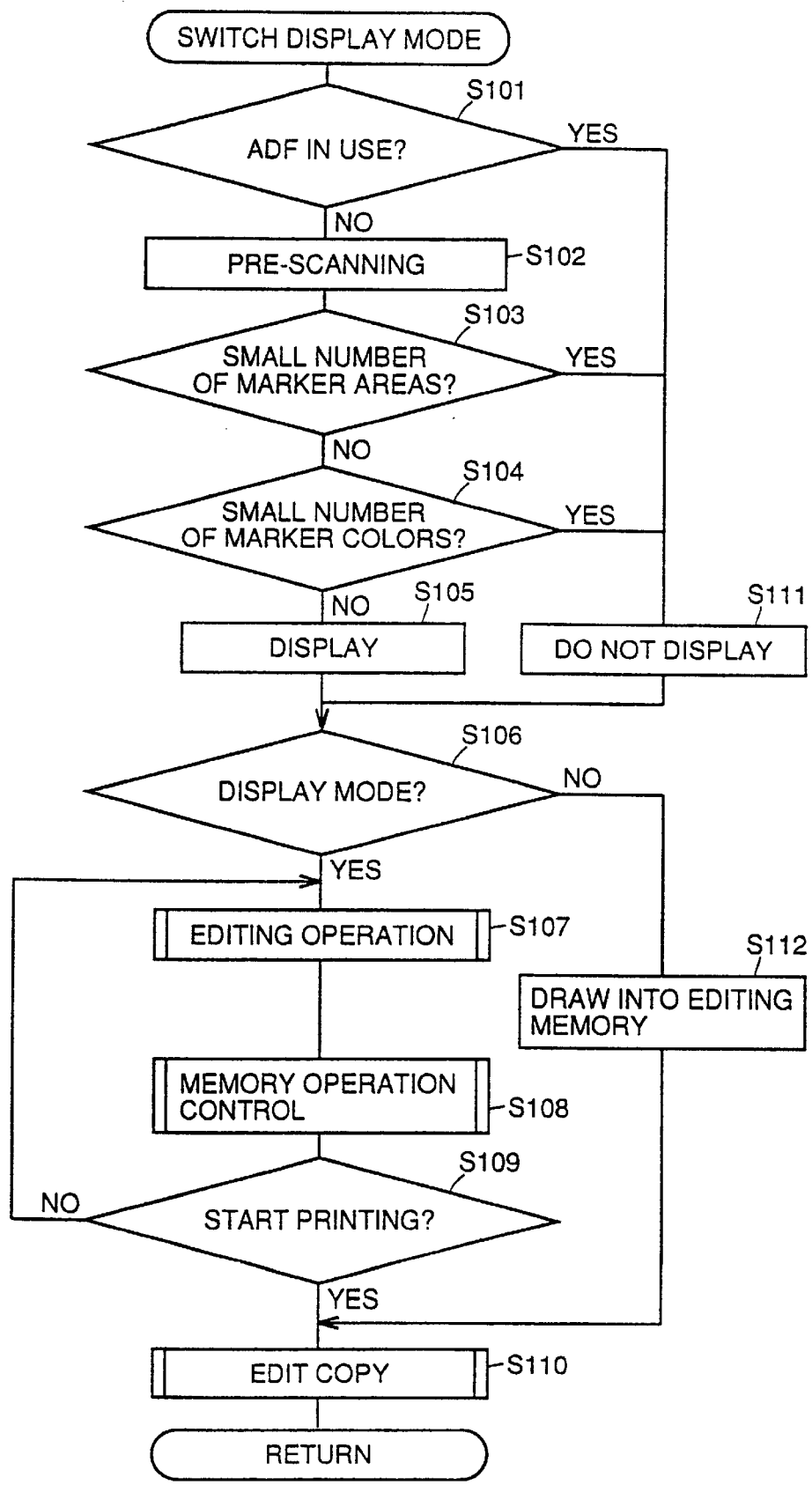
FIG. 4 is a flow chart for display mode switching process.

FIG. 4 is a flow chart for illustrating the process for automatically switching whether the document image is displayed on color LCD 115 or not.

Referring to FIG. 4, at step S101, determination is made on whether automatic document feeder (ADF) is employed or not. When it is (YES at S101), a large amount of documents are subjected to copy output, and since productivity of the copying is reduced significantly if display of the document image is performed on the color LCD for each of the document, the process is progressed to step S111 and display of the document image on the color LCD is inhibited.

When NO at step S101, determination is made at step S103 after pre-scanning at S102 on whether the number of areas in the document specified by the marker is small, for instance, five or less. When NO at step S103, that is, when the number of areas is small, determination is made at step S104 on whether the number of colors used for the specification by the markers is small or not, for instance, less than three colors.

When NO at step S104, that is, if the number of colors of the marker is small, process is progressed to a mode for displaying the document (S105). On the other hand, when YES at either of steps 103 or 104, process is progressed to a mode in which document is not displayed (S111).

If both of the numbers of marker areas and colors of the markers are small, the marker specification performed is a simple one. When every one of the documents are displayed for such simple marker specification, manipulation by the user would be made troublesome, and therefore, documents are not displayed on LCD 115 when either one of the number of marker areas and the number of marker colors is small. It may be noted that the above-described numbers of the area and markers are arbitrary and can be variable by the user.

At step S106, determination is made on whether the mode for displaying the documents on color LCD 115 is performed.

When NO at step S106, the image data read by the image reader at step S112 is not displayed on color LCD 115 and is stored in editing memory 117 via control CPU 110.

Thereafter, the image data stored in editing memory 117 at step S110 is edited, and is copied by the printer. Thus, the copying is completed.

On the other hand, when YES at step S106, operation control is performed for the editing process in accordance with the color and the area of the marker in the document at step S107. Thereafter, at step S108, operation control of the image in the memory is performed by the user. The process at step S108 will be described later.

At step S109, determination is made on whether instruction is given from the user to start printing (more specifically, whether the start key is pressed at FIG. 13) or not.

When YES at step S109, edited copying is performed at step S111.

Meanwhile, if NO at step S109, processes of steps S107 and S108 are repeated again.

Figure 17:
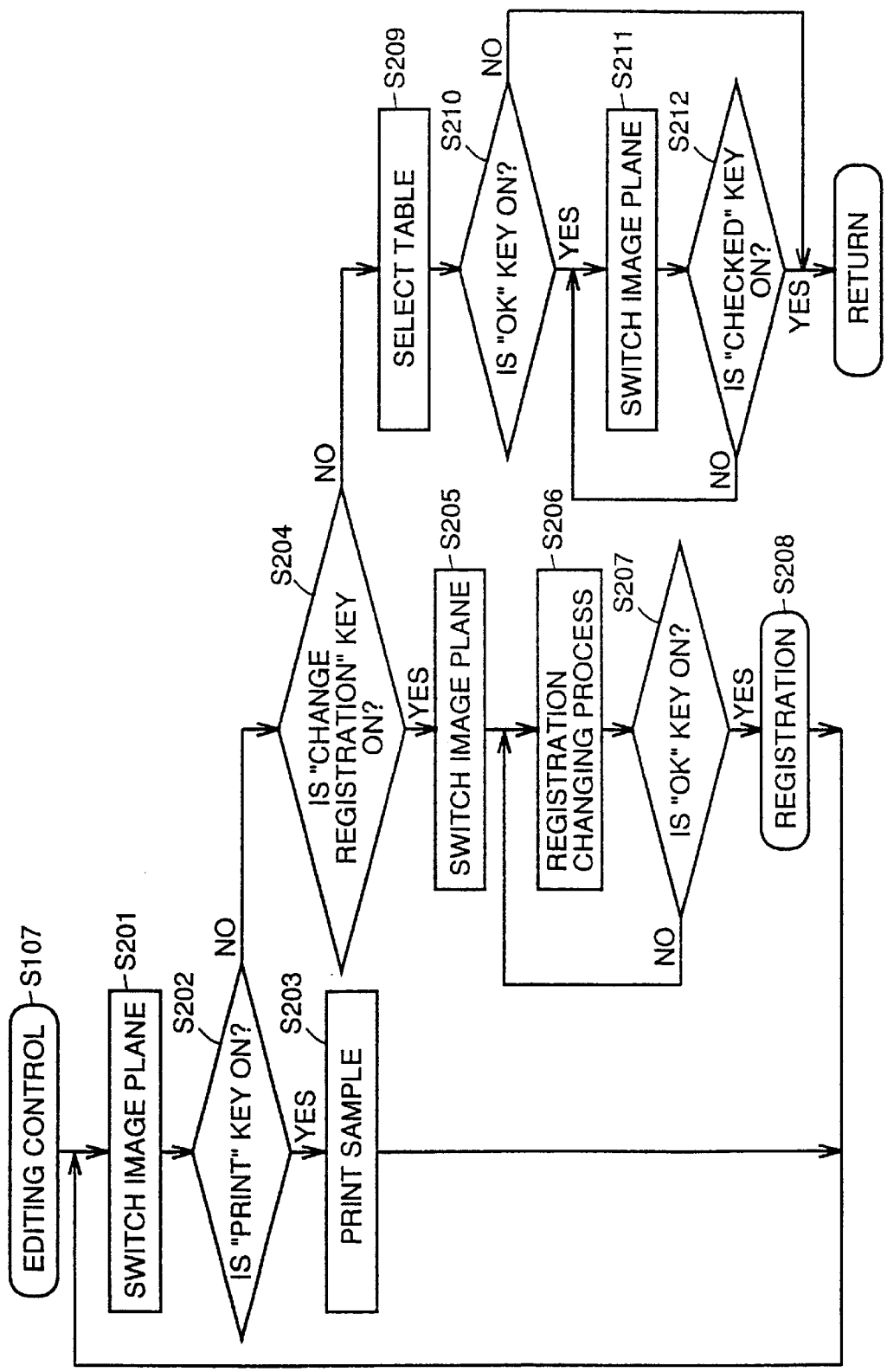
FIG. 17 is a flow chart for a process in the editing operation routine (S107) of FIG. 4.

FIG. 17 shows a sub routine for editing operation controlling process of step S108 shown in FIG. 4.

First, at step S201, image plane of color LCD 115 is switched to the state shown in FIG. 8. Then, determination is made on whether the print key an the upper portion of the image plane of FIG. 8 is ON or not at step S202. Here, when print key is ON, sample indicating the colors of the markers and the content of the editing processes corresponding to those colors is printed out as shown in FIG. 9 at step S203. Thereafter, process from step S201 is performed.

Meanwhile, if it is determined that print key is not ON at step S202, determination is made on whether a registration change key at the upper portion of the image plane shown in FIG. 8 is ON or not at step S204. Here, if registration change key is ON, the image plane of color LCD 115 is switched to the state shown in FIG. 10 at step S205. Then, after changing the content of the editing process at step S206, the process is halted, waiting for the OK button to be ON at step S207. Thereafter, when the OK button is turned ON, the changed content of the editing process is registered. Then, process from step S201 is performed.

Meanwhile, if it is determined that registration change key is not ON at step S204, determination is made on whether one of the frames 1 to 8 in the image plane of FIG. 8 is selected at step S209. Here, for example, if the ON key at the upper portion of the image plane of FIG. 8 is pressed after the user has selected frame 6 (step S210), the image plane of color LCD 115 is switched to the state shown in FIG. 11 (step S211). Then, the user presses the "checked" key after checking the sample, how the documents are set and the like, and the process returns to the main routine.

Figure 5:
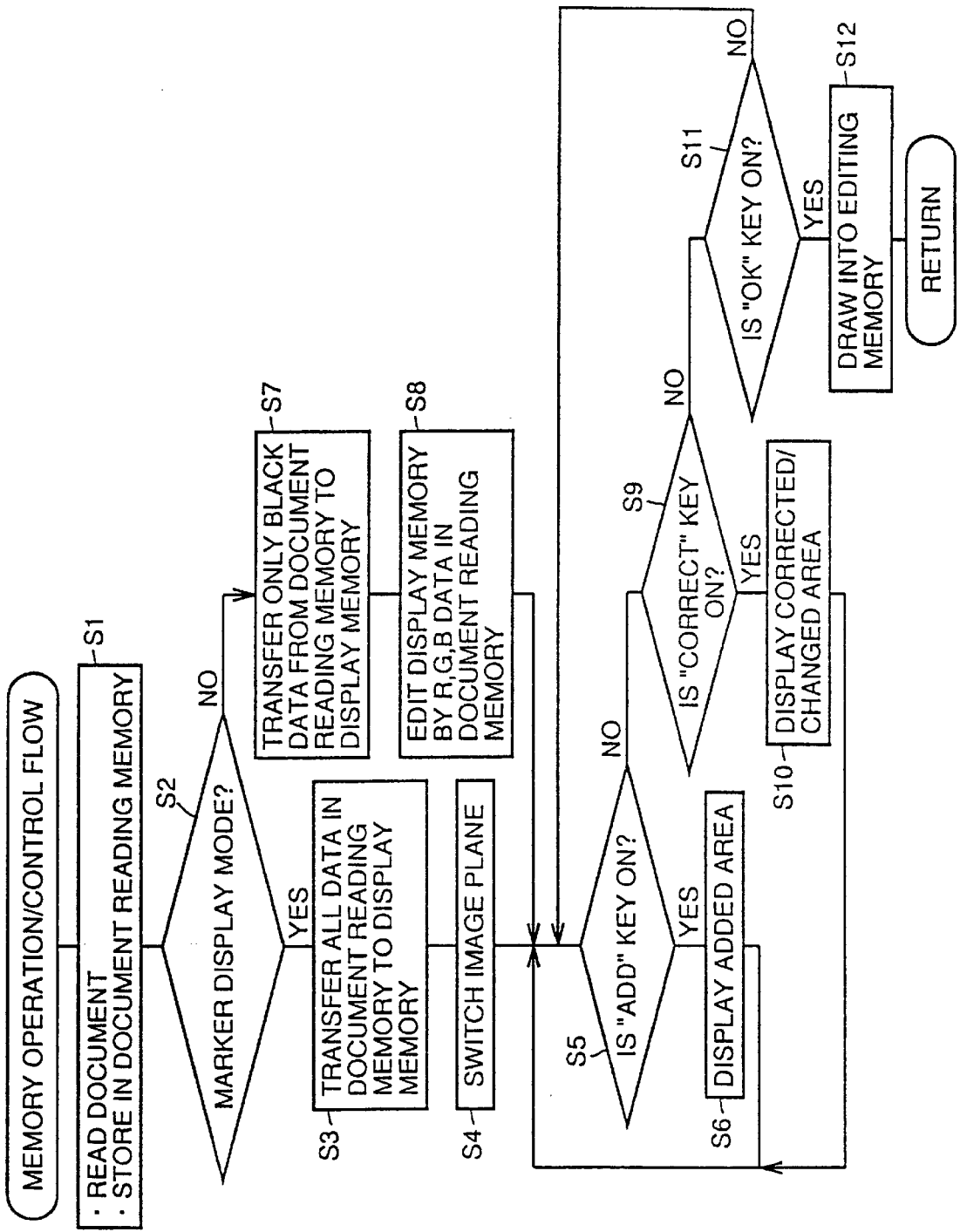
FIG. 5 is a flow chart for a specific example of step S108 in FIG. 4.

FIG. 5 is a flow chart for illustrating the specific example for the memory operation controlling process of step S108 shown in FIG. 4.

Referring to FIG. 5, document is read by the image reader at step S1. The read data is stored in document reading memory 109.

At step S2, determination is made on whether the marker display mode is selected in which the read document with markers thereon is displayed as it is, or the edited display mode is selected in which the document after being edited according to the marker is displayed.

When it is determined that the marker display mode is selected at step S2 (YES at step S2), data corresponding to all of the colors are transferred from all of the planes 109K to 109B of the document reading memory to display memory 114. Accordingly, the read document image is displayed on color LCD 115 as it is. Then, the image plane of LCD 115 is switched to the state shown in FIG. 12 at step S4.

Thereafter, at step S5, determination is made on if there is addition of area indicated with the marker by the user. This is a determination on whether the add key at the upper portion of the image plane shown in FIG. 12 is ON/OFF.

If YES at step S5, the displayed image plane is switched to the state shown in FIG. 14 at step S6, the user adds an area through icon 201, and the added area is displayed.

After the process of step S6, the process from step S5 is carried on again.

When NO is determined at step S5, determination is made at step S9 on whether there should be any correction or change to the edited area specified by the marker at step S9 and the area added at step S6. In other words, ON/OFF of the correct key at the upper portion of the image plane shown in FIGS. 12 and 13 is determined.

When YES at step S9, the user makes corrections/changes to the area so that the result is displayed, at step S10.

Figure 18:
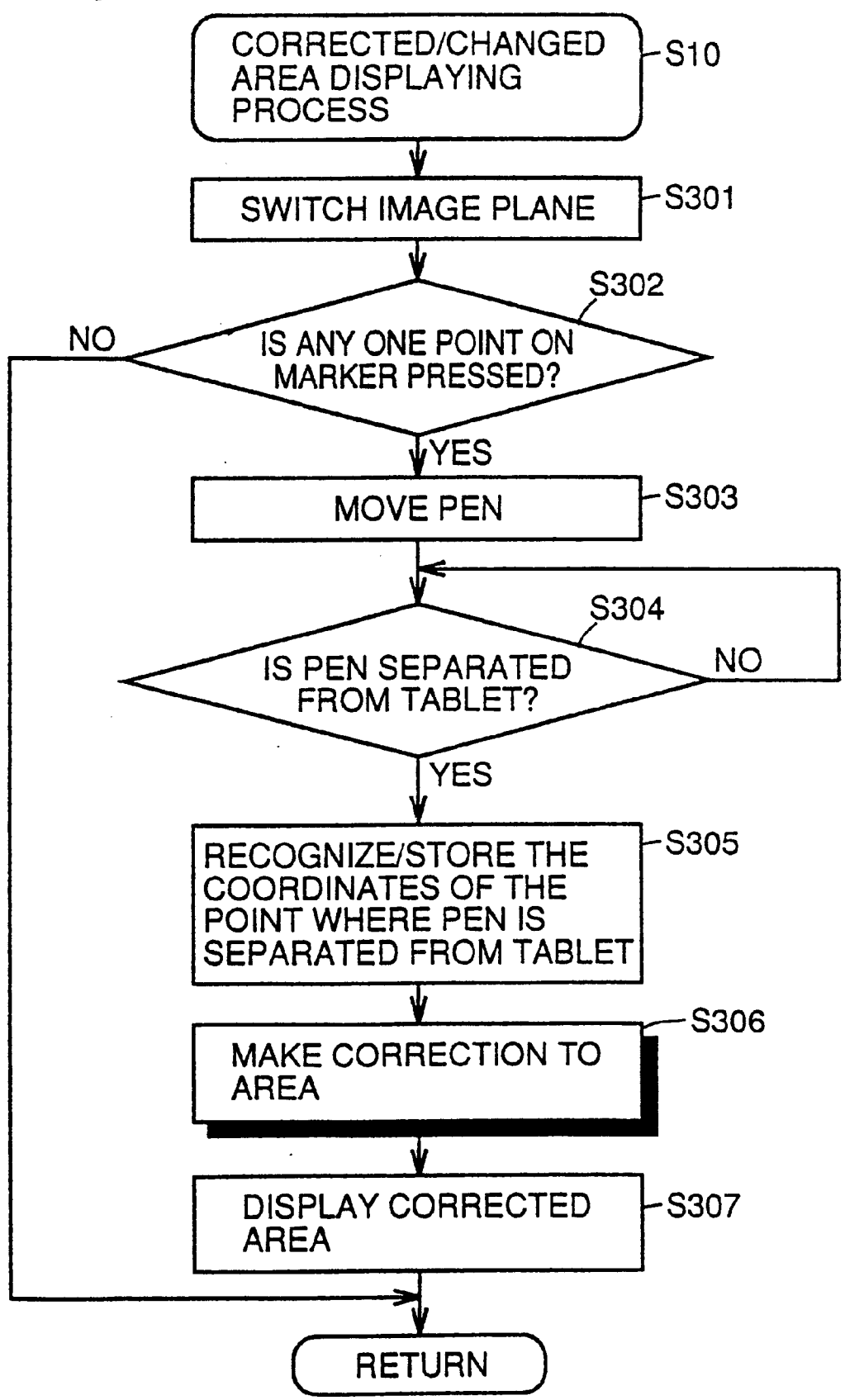
FIG. 18 is a flow chart for a process in the corrected and changed area displaying routine (S10) of FIG. 5.

Detailed description will now be given for the control (step S10) of display process of corrected/changed area, with reference to FIG. 18.

First, when it is determined that correct key is ON at step S9, the image plane of FIG. 12 which had been displayed on color LCD 115 is switched to the image plane of FIG. 14 (step S301). Then, determination is made on whether pen 800 is pressed onto any one point of the marker in the marker area displayed on tablet 116 (step S302). If pen 800 is pressed onto any one point on the marker, the user moves this pen 800 on tablet 116 while still pressing the tablet with the pen (step S303). Then, at step S304, detection is made on whether pen 800 is lifted up from the tablet or not. Thereafter, the coordinates of the point where pen 800 was lifted up from tablet 116 is recognized at CPU 110 and is stored (step S305).

However, correction is made only to the coordinates of an arbitrary one point of the marker with the control performed until step S305. Therefore, the entire coordinates of the marker area is corrected in accordance with this recognized coordinates of one arbitrary point of the marker (step S306), and according to this corrected coordinates, a new marker area is developed in display memory 114 (step S307). Then, the process is returned.

If the pen 800 had been pressing the tablet 116 at a point which is not an arbitrary one point on the marker, process is returned without allowing correction/change of the marker area.

When NO is determined at step S9, it is decided at step S111 whether the area specified by the marker at step S111 and area added, corrected or changed at steps S6, S10 are determined or not. More specifically, this determination is performed by the user indicating the "OK" region (FIG. 14) displayed on the image plane by the pen.

When YES at step S11, the document image together with the area specified by the marker is stored in editing memory 117.

On the other hand, if NO in step S11, process from step S6 is repeated.

Meanwhile, when it is determined that edited display mode is selected in which the image after being subjected to image editing process of the area encircled by the marker is displayed (NO at S2), only the content of plane of the memory 109K for black in the document reading memory is transferred to display memory 114 at step S7.

Thereafter, in accordance with the content stored in each of the planes of the document reading memory, that is, planes for red 109R, green 109G, and blue 109B, data in the display memory is edited at step S5. In this way, the image plane obtained as a result of editing by the marker is output on color LCD 115.

Based upon the foregoing, the photocopier in accordance with the present embodiment has the following effects.

(1) Since the result of editing (image processing) according to the marker is displayed on the color LCD before copy output such that the user can check this result, photocopying by mistake can be reduced significantly.

(2) Even if the result obtained from the editing is not desirable, since information for editing by the marker can be added, changed and so on from the tablet on the color LCD, the need of marking the actual document again is eliminated.

(3) The user can set the color of the marker and the process corresponding to the color in a simple manner such that the apparatus would be utilized more conveniently.

(4) The operator can color the document with the marker referring to a sample in print indicating the relationship between the color of the marker and the process corresponding to that color. Thus, the apparatus can be utilized more conveniently. In addition, since the color of the marker on the printed sample is closer to the real color of the marker as compared to the color seen on the color LCD, coloring can be done more accurately.

Although the present invention has been described and illustrated in detail, it is clearly understood that the same is by way of illustration and example only and is to be taken by way of limitation, the spirit and scope of the present invention being limited only by the terms of the appended claims.

What is claimed is:

1. An image processing apparatus, comprising:
   a scanner for scanning a document having an area which is indicated by a mark to produce electronic image data;
   a detector for detecting the position of the area from the image data obtained by said scanner;
   editing processing means for performing an editing process on the image data within the area;
   a display capable of displaying the image data obtained by said scanner and the image data on which the editing process has been performed; and
   counting means for counting the number of areas which are indicated by the mark provided on a document.

2. The image processing apparatus according to claim 1, wherein said image processing apparatus inhibits display of all image data on said display when the number of areas is smaller than a prescribed number.

3. The image processing apparatus according to claim 1, further including area adding means for adding an area to be edited from said display on which the image data is displayed.

4. The image processing apparatus according to claim 3, wherein said area adding means includes a tablet provided on said display, and addition of the area to be edited is possible by pressing this tablet.

5. The image processing apparatus according to claim 3, further including a printer for printing out the image data on which the editing process has been performed.

6. The image processing apparatus according to claim 3, wherein said editing process includes masking, trimming, and color conversion processes.

7. The image processing apparatus according to claim 3, further including display switching means for switching a displaying state on said display, wherein said display switching means performs switching between the display of the image data obtained by the scanner and the image data on which the editing process has been performed.

8. The image processing apparatus according to claim 3, wherein said image processing apparatus inhibits display of all image data on said display when the number of colors of the mark is smaller than a prescribed number.

9. The image processing apparatus according to claim 3, further including storing means for storing a plurality of colors of markers for providing the mark and the content of editing processes preset corresponding to the colors of the markers respectively in a corresponding manner, wherein the content of the editing processes preset corresponding to the colors of the markers is respectively different for every marker.

10. The image processing apparatus according to claim 9, further including changing means for changing the correlation between the plurality of colors of the markers and the content of the editing processes preset for respective markers.

11. The image processing apparatus according to claim 3, further including a document feeding device for feeding the document.

12. The image processing apparatus according to claim 1, further including area correcting means for correcting the area to be edited on said display on which the image data is displayed.

13. The image processing apparatus according to claim 12, wherein said area correcting means includes a tablet provided on said display, and correction of the area to be edited is possible by pressing this tablet.

14. An image processing apparatus comprising:
   a scanner for scanning a document having an area which is indicated by a mark to produce electronic image data;
   a detector for detecting the position of the area from the image data obtained by said scanner;
   editing processing means for performing an editing process on the image data within the area;
   a display capable of displaying the image data obtained by said scanner and the image data on which the editing process has been performed; and
   storing means for storing a plurality of colors of markers for providing the mark and the content of editing processes preset corresponding to the colors of the markers respectively in a corresponding manner, wherein the content of the editing processes preset corresponding to the colors of the markers is respectively different for every marker;
   wherein said storing means stores a plurality of frames, wherein each frame stores a plurality of colors of the markers for providing the mark and the content of preset editing processes corresponding to the colors of the markers, respectively, wherein the frames differ from each other.

15. The image processing apparatus according to claim 14, further including:
   means for simultaneously displaying the plurality of frames; and
   means for allowing a user to select one of said frames.

16. The image processing apparatus according to claim 15, wherein said one of said frames selected by said user can be displayed adjacent to said image data on which the editing process has been performed.

* * * * *

UNITED STATES PATENT AND TRADEMARK OFFICE
CERTIFICATE OF CORRECTION

PATENT NO.    : 6,345,118 B1
DATED         : February 5, 2002
INVENTOR(S)   : Hiroyuki Ideyama It is certified that error appears in the above-identified patent and that said Letters Patent is hereby corrected as shown below:

<u>Column 15,</u>
Line 40, please replace claim 3 to read as follows:

3.   An image processing apparatus, comprising:
   a scanner for scanning a document having an area which is indicated by a mark to produce electronic image data:
   a detector for detecting the position of the area from the image obtained by said scanner;
   editing processing means for performing an editing process on the image data within the area;
   a display capable of displaying the image data of the entire document and the mark and having the area which is indicated by the mark obtained by said scanner and the image data on which the editing process has been performed; and
   area adding means for adding an area to be edited from said display on which the image data is displayed.

<u>Column 16,</u>
Line 19, please replace claim 12 to read as follows:

12.   An image processing apparatus, comprising:
   a scanner for scanning a document having an area which is indicated by a mark to produce electronic image data:
   a detector for detecting the position of the area from the image data obtained by said scanner;
   editing processing means for performing an editing process on the image data within the area;

UNITED STATES PATENT AND TRADEMARK OFFICE
CERTIFICATE OF CORRECTION

PATENT NO. : 6,345,118 B1
DATED : February 5, 2002
INVENTOR(S) : Hiroyuki Ideyama It is certified that error appears in the above-identified patent and that said Letters Patent is hereby corrected as shown below:

<u>Column 16 cont'd,</u>
 a display capable of displaying the image data of the entire document and the mark and having the area which is indicated by the mark obtained by said scanner and the image data on which the editing process has been performed; and
 area correcting means for correcting the area to be edited on said display on which the image data is displayed.

Signed and Sealed this

Twenty-sixth Day of November, 2002

*Attest:*

*Attesting Officer*

JAMES E. ROGAN
*Director of the United States Patent and Trademark Office*